United States Patent
Noumi et al.

(10) Patent No.: US 8,122,316 B2
(45) Date of Patent: Feb. 21, 2012

(54) ERROR DETECTOR AND ERROR DETECTION METHOD

(75) Inventors: Kaoru Noumi, Kobe (JP); Susumu Nishihashi, Kobe (JP); Tomoyuki Katou, Kobe (JP); Yukio Ishikawa, Kobe (JP); Yasuyuki Umezaki, Kawasaki (JP); Hidetaka Ebeshu, Kawasaki (JP); Shigeo Koide, Kawasaki (JP); Yukio Fujisawa, Tokyo (JP); Hiroaki Shimauchi, Tokyo (JP)

(73) Assignees: Fujitsu Ten Limited, Kobe-shi (JP); Fujitsu Semiconductor Limited, Yokohama-shi (JP); Renesas Electronics Corporation, Kawasaki-shi (JP)

( * ) Notice: Subject to any disclaimer, the term of this patent is extended or adjusted under 35 U.S.C. 154(b) by 1153 days.

(21) Appl. No.: 11/976,544

(22) Filed: Oct. 25, 2007

(65) Prior Publication Data

US 2008/0141074 A1 Jun. 12, 2008

(30) Foreign Application Priority Data

Oct. 27, 2006 (JP) ................................. 2006-293371

(51) Int. Cl.
| | |
|---|---|
| *H03M 13/00* | (2006.01) |
| *G06F 11/00* | (2006.01) |
| *G06F 11/30* | (2006.01) |
| *G08C 25/00* | (2006.01) |
| *H04L 1/00* | (2006.01) |

(52) U.S. Cl. ........................................ 714/758; 714/746
(58) Field of Classification Search ........................ None
See application file for complete search history.

(56) References Cited

U.S. PATENT DOCUMENTS

| | | | | | |
|---|---|---|---|---|---|
| 4,794,597 | A | * | 12/1988 | Ooba et al. | 714/703 |
| 5,402,430 | A | * | 3/1995 | Asai et al. | 714/800 |
| 5,515,383 | A | * | 5/1996 | Katoozi | 714/732 |
| 5,908,471 | A | * | 6/1999 | Lach et al. | 714/805 |
| 6,295,617 | B1 | * | 9/2001 | Sonobe | 714/718 |
| 6,397,357 | B1 | * | 5/2002 | Cooper | 714/703 |
| 7,818,651 | B2 | * | 10/2010 | Nagai et al. | 714/762 |
| 2003/0079073 | A1 | * | 4/2003 | Richard et al. | 710/302 |
| 2003/0106010 | A1 | * | 6/2003 | Fujioka et al. | 714/763 |

(Continued)

FOREIGN PATENT DOCUMENTS

JP 02-123631 U 10/1990
(Continued)

OTHER PUBLICATIONS

Jan. 8, 2010 Office Action issued in Chinese Patent Application No. 2006800414231 (with English translation).

(Continued)

*Primary Examiner* — Jeffrey A Gaffin
*Assistant Examiner* — Guerrier Merant
(74) *Attorney, Agent, or Firm* — Oliff & Berridge, PLC

(57) ABSTRACT

An error detector has a parity bit generator which generates error detection data for data strings sent from a CPU I/F to a memory, a parity checker which detects an error in the data strings output from the memory based on the error detection data, and a selector circuit which switchingly outputs the data from the parity bit generator and the data from a CPU which sends diagnostic data. While the selector circuit is switched to output the data from the CPU, based on the error detection data output from the selector circuit, the error detector conducts a failure diagnosis of error detection functions including at least one of the parity bit generator and the parity checker.

3 Claims, 26 Drawing Sheets

U.S. PATENT DOCUMENTS

2005/0251728 A1* 11/2005 Stocken .................. 714/763
2006/0253723 A1* 11/2006 Wu et al. ................... 714/1

FOREIGN PATENT DOCUMENTS

| JP | A 05-083847 | 11/1993 |
|----|----|----|
| JP | A 10-078891 | 3/1998 |
| JP | A 2003-244187 | 8/2003 |
| JP | A 2003-264571 | 9/2003 |
| JP | A 2004-021922 | 1/2004 |
| JP | A-2005-215590 | 8/2005 |

OTHER PUBLICATIONS

Office Action issued in JP Application No. 2006-293371 on Sep. 21, 2010 (with English translation).

* cited by examiner

FIG. 20A
SELECTOR UNIT INPUT DATA

| IDE | RTR | CAN ID | DATA | DLC |
|---|---|---|---|---|
| 1BIT | 1BIT | 29BIT | 64BIT | 4BIT |

FIG. 20B
SELECTOR UNIT OUTPUT (DATA WITH TIME STAMP)

| RXCH | IDE | RTR | CAN ID | DATA | DLC | TS |
|---|---|---|---|---|---|---|
| 6BIT | 1BIT | 1BIT | 29BIT | 64BIT | 4BIT | * |

DATA USED IN SEARCH ENGINE UNIT (RXCH, IDE, RTR, CAN ID)

*: MULTIPLE BITS

FIG. 20C
INFORMATION WRITTEN IN SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

*: MULTIPLE BITS

FIG. 20D
DATA READ BY CPU FROM SENDING FIFO

| IDE | RTR | CAN ID | DATA | DLC | TS | LABEL |
|---|---|---|---|---|---|---|
| 1BIT | 1BIT | 29BIT | 64BIT | 4BIT | * | * |

*: MULTIPLE BITS

ERROR DETECTOR AND ERROR DETECTION METHOD

INCORPORATION BY REFERENCE

The disclosure of Japanese Patent Application No. 2006-293371 filed on Oct. 27, 2006 including the specification, drawings and abstract is incorporated herein by reference in its entirety.

BACKGROUND OF THE INVENTION

1. Field of the Invention

The present invention relates to an error detector that detects data errors. More particularly, the present invention relates to an error detector suitable for installation on an in-vehicle gateway apparatus which relays data among a plurality of communication networks.

2. Description of the Related Art

In recent years, a plurality of ECUs such as an engine ECU, a door controlling ECU, an air-bag ECU, an audio ECU and a navigation ECU have been installed in a vehicle, as shown in FIG. 24. In order for these ECUs to make communication among a plurality of LANs that have different communication protocols and are in different communication speeds installed in a vehicle, a gateway apparatus which serves as an interface is required. Japanese Patent Application Publication Nos. JP-A-2003-244187 and JP-A-2003-264571 disclose technologies of routing function of the gateway apparatus realized in software.

The gateway apparatus relays data sent and received among a plurality of different networks and realizes gateway functions such as communication protocol conversions and packet filtering. Consequently, a communication is made between nodes that are connected to different networks. As a plurality of devices is connected via networks and data is sent and received by communication, data errors in communication may occur. The data stored in a memory may have errors caused by garbled bits and such. While installation of a device with a data check function has been designed to increase the reliability of data, unless otherwise a device to verify that the check function itself is functioning normally is provided, the reliability of data lowers.

In Japanese Utility Model Application Publication No. JP-UM-A-H5-83847, out of data input to memory, a parity bit generated by a parity generator is inverted by an error generator and error data is stored in a memory for parity. In a read cycle, by comparing the data with the memory data, a parity checker is configured to output an error signal.

However, in the invention disclosed in Japanese Utility Model Application Publication No. JP-UM-A-H5-83847, as a diagnostic signal is generated by inverting an output signal of a parity generator by an error generator, when the parity checker is tested, it has not been possible to distinguish a failure of the parity generator from that of the error generator.

SUMMARY OF THE INVENTION

The present invention addresses the problems described above and aims to provide an error detector and an error detection method capable of performing a thorough failure diagnosis of an error detection function.

In view of the foregoing, an error detector according to one aspect of the present invention includes an error detection data generating unit that generates error detection data for a data string sent from a first apparatus to a second apparatus, an error detecting unit that detects, based on the error detection data generated by the error detection data generating unit, an error in a data string output from the second apparatus, a data switching unit that switchingly outputs data from the error detection data generating unit as error detection data for the data string and data sent from a diagnostic data sending unit that sends diagnostic data, and a failure diagnosing unit that diagnoses a failure in an error detection function including at least one of the error detection data generating unit and the error detecting unit based on the error detection data output from the data switching unit while the data switching unit is switched to output data sent from the diagnostic data sending unit.

Accordingly, a thorough failure diagnosis of the data switching unit and the error detection function can be performed with the error detection data generated by the error detection data generating unit and the data sent from the diagnostic data sending unit.

The error detector may also include a determining unit that determines the data switching unit operates normally in response to a coincidence between diagnostic data written in the second apparatus and diagnostic data read from the second apparatus while the data switching unit is switched to output the diagnostic data sent from the diagnostic data sending unit and further to a non-coincidence between the diagnostic data output from the diagnostic data sending unit and the data read from the second apparatus while the data switching unit is switched to output error detection data from the error detection data generating unit.

Accordingly, failures such as biased outputs from the data switching unit can be detected.

In the error detector, while the determining unit determines that the data switching unit operates normally and the data switching unit outputs the diagnostic data sent from the diagnostic data sending unit, the determining unit determines the error detecting unit operates abnormally in response to a non-coincidence between the diagnostic data and a detection result made by the error detecting unit for the data string output from the second apparatus.

Accordingly, the operation of the error detection function is verified after the operation of the data switching unit is verified, making the operation verification of the error detection function highly accurate.

In the error detector, the error detection data generated by the error detection data generating unit is data to be used for a parity check of the data string, and the error detecting unit performs a parity check of the data string output from the second apparatus.

Accordingly, errors in the data string can be easily detected.

In the error detector, the first apparatus is at least one of a controlling unit of a gateway apparatus that controls transfer of frame data between a plurality of communication channels and a search engine unit that controls transfer of the frame data, and the second apparatus is a memory unit that stores data.

In the error detector, the data string includes at least one of post-routing frame data that is output from at least one of the controlling unit and the search engine unit and routing data to be used for controlling transfer of the frame data.

An error detection method according to another aspect of the present invention includes: adding, to a data string sent from a first apparatus to a second apparatus, either error detection data generated by an error detection data generating unit or diagnostic data sent from a diagnostic data sending unit; detecting an error in a data string output from the second apparatus by an error detecting unit based on the error detection data, when the error detection data is added to the data string; and diagnosing a failure of an error detection function including at least one of the error detection data generating unit and the error detecting unit based on the diagnostic data, when the diagnostic data is added to the data string.

The present invention provides a thorough failure diagnosis of an error detection function to be performed.

BRIEF DESCRIPTION OF THE DRAWINGS

FIGS. 20A through 20D show configurations of frame data processed in the gateway hardware macro section.

DETAILED DESCRIPTION OF THE PREFERRED EMBODIMENTS

Specific instances of preferred embodiments of the present invention are described in reference with attached drawings.

First Embodiment

Figure 1:
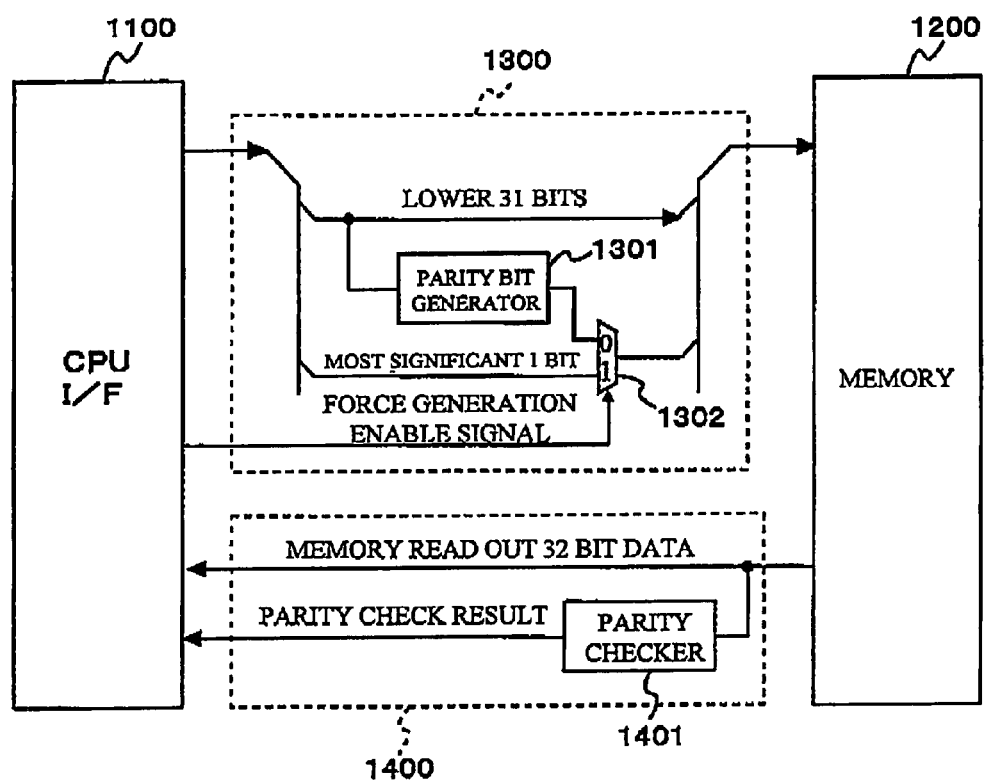
FIG. 1 is an illustration showing a configuration of an error detector.

In reference with FIG. 1, a configuration of an error detector 1000 of a first embodiment of the present invention is described.

Bus lines that connect between a CPU I/F 1100 and a memory 1200 are connected with a parity bit summing unit 1300 which includes a parity bit generator 1301 (corresponds to an error detection data generator of the present invention) and a selector circuit 1302 (corresponds to a data switcher of the present invention).

The parity bit generator 1301 performs a parity operation on a data string which a CPU (corresponds to a diagnostic data transmitter and a failure diagnostic tool of the present invention) writes to the memory 1200, and appends a parity bit of the operation result to the data string. For example, when 32 bit data is written to the memory 1200, a parity operation on a data string composed of 31 bits is performed and a parity bit of the operation result is appended to the most significant bit (32nd bit) of the data string.

The selector circuit 1302 is a circuit to select the parity bit to be appended to a data string to be either an operation result of the parity bit generator 1301 or a parity bit output from the CPU. The selector circuit 1302 is fed with a force generation enable signal which the CPU outputs. The selector circuit 1302, when the force generation enable signal is fed, switches a parity bit which is appended to a data string from an output of the parity bit generator 1301 to that of the CPU. The CPU generates diagnostic data (1 bit) which makes the result of a parity operation normal or abnormal and is appended to a data string for testing. When the data string with diagnostic data appended is written to the memory 1200, the CPU stores the address of the data string written and errata information of the diagnostic data appended to the data string linked together.

The bus lines which connect between the CPU I/F 1100 and the memory 1200 are provided with a checker 1400 which includes a parity checker 1401. The parity checker 1401 (corresponds to an error detector of the present invention) performs a parity check on a data string read out from the memory 1200 and outputs the result of the parity check to the CPU.

When the data string for testing is written to the memory 1200 for a predefined number of times, the CPU reads out the data string written for testing from the memory 1200. In the checker 1400, the parity checker 1401 performs a check on the data string read out from the memory 1200. The result of the check is notified to the CPU.

When the data string is read out from the memory 1200, the CPU verifies the operation of the parity checker 1401, based on the errata information of the parity bit appended and the result of the parity check by the parity checker 1401.

Figure 2:
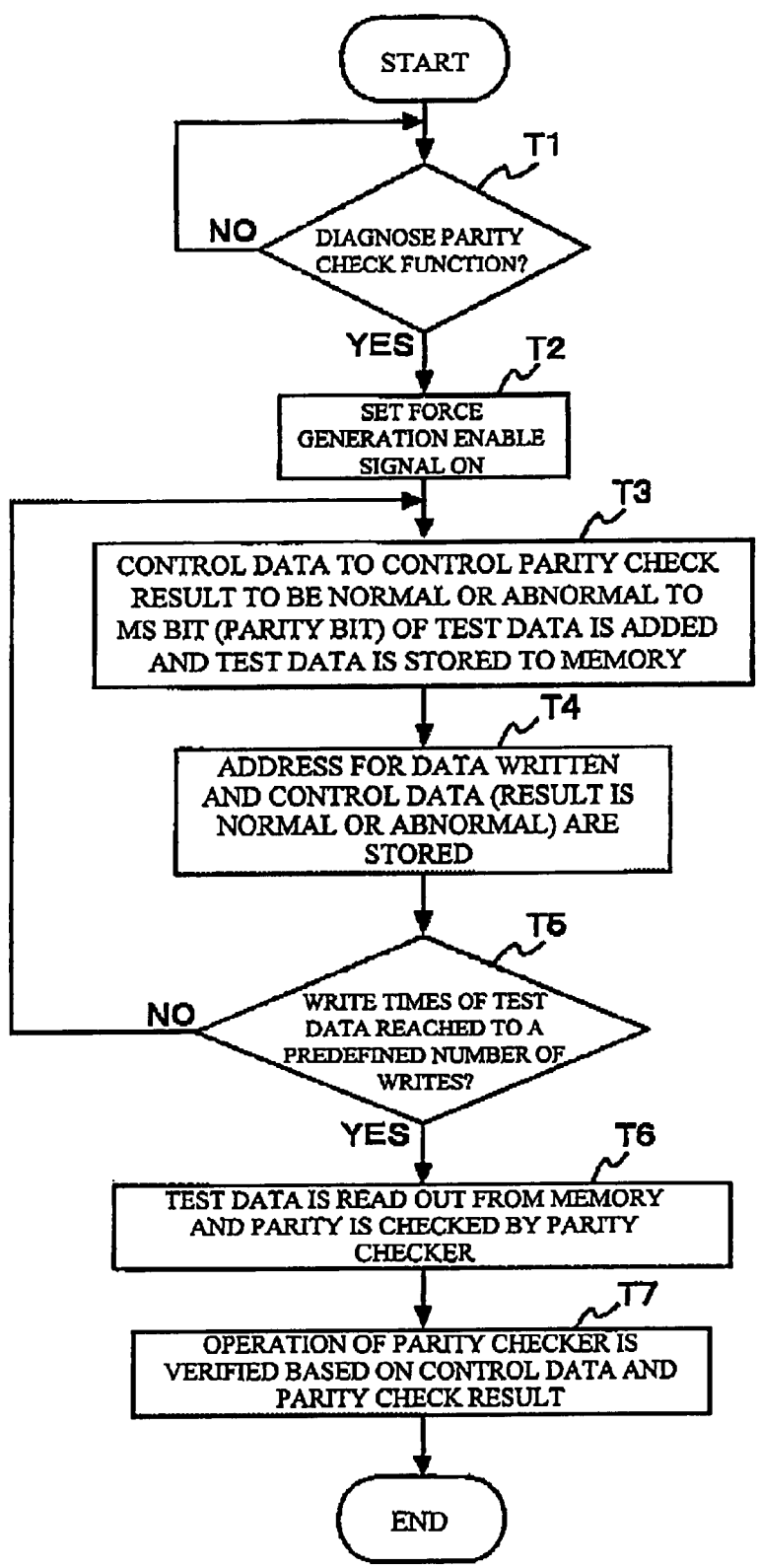
FIG. 2 is a flowchart showing a processing procedure of the error detector.

In reference with FIG. 2, an operation procedure of the first embodiment is described.

When starting a diagnosis of the parity checker 1401 (step T1), the CPU sets the force generation enable signal to on (step T2).

When the force generation enable signal is set to on, the CPU appends diagnostic data (1 bit) which makes the result of the parity check normal or abnormal to the most significant bit (the parity bit) of a data string for testing and stores the data string to the memory 1200 (step T3). The CPU stores the address of the data string written to the memory 1200 and the errata information of the diagnostic data appended to the data string (step T4).

When the number of writing data for testing is reached to a predefined number of times (step T5; YES), the CPU reads out the data string for testing from the memory 1200. In this case, the parity checker 1401 performs a parity check on the read out data for testing (step T6). When the result of the parity check on the data for testing is obtained, the CPU judges whether the parity checker 1401 is operating properly or not, based on the result of the parity check and the errata information of the diagnostic data stored.

An abnormality may be developed in the result of a parity check caused by an abnormal fixation of the selector circuit 1302.

First, the force generation enable signal is set to on for the selector circuit 1302 to output a signal from the CPU. Then, as diagnostic data, 0 and 1 are switched around and stored in the memory 1200. In this case, by comparing the diagnostic data read out from the memory 1200 with the diagnostic data output from the CPU, whether the both data match or not is judged. When the both data match, the force generation enable signal is set to off. Then, the CPU outputs diagnostic data by switching around 0 and 1.

In this case, by comparing the data read out from the memory 1200 with the diagnostic data output from the CPU, whether the both data match or not is judged. When the both data do not match, it is judged as the abnormal fixation of the selector circuit 1302 is not developed.

By performing a failure diagnosis of the parity checker 1401 following the judgment of abnormal fixation of the selector circuit 1302 by the procedure described above, the accuracy of error detection is increased.

Second Embodiment

Next, a configuration of an in-vehicle gateway apparatus 1 with the abovementioned error detector 1000 installed is described.

Figure 3:
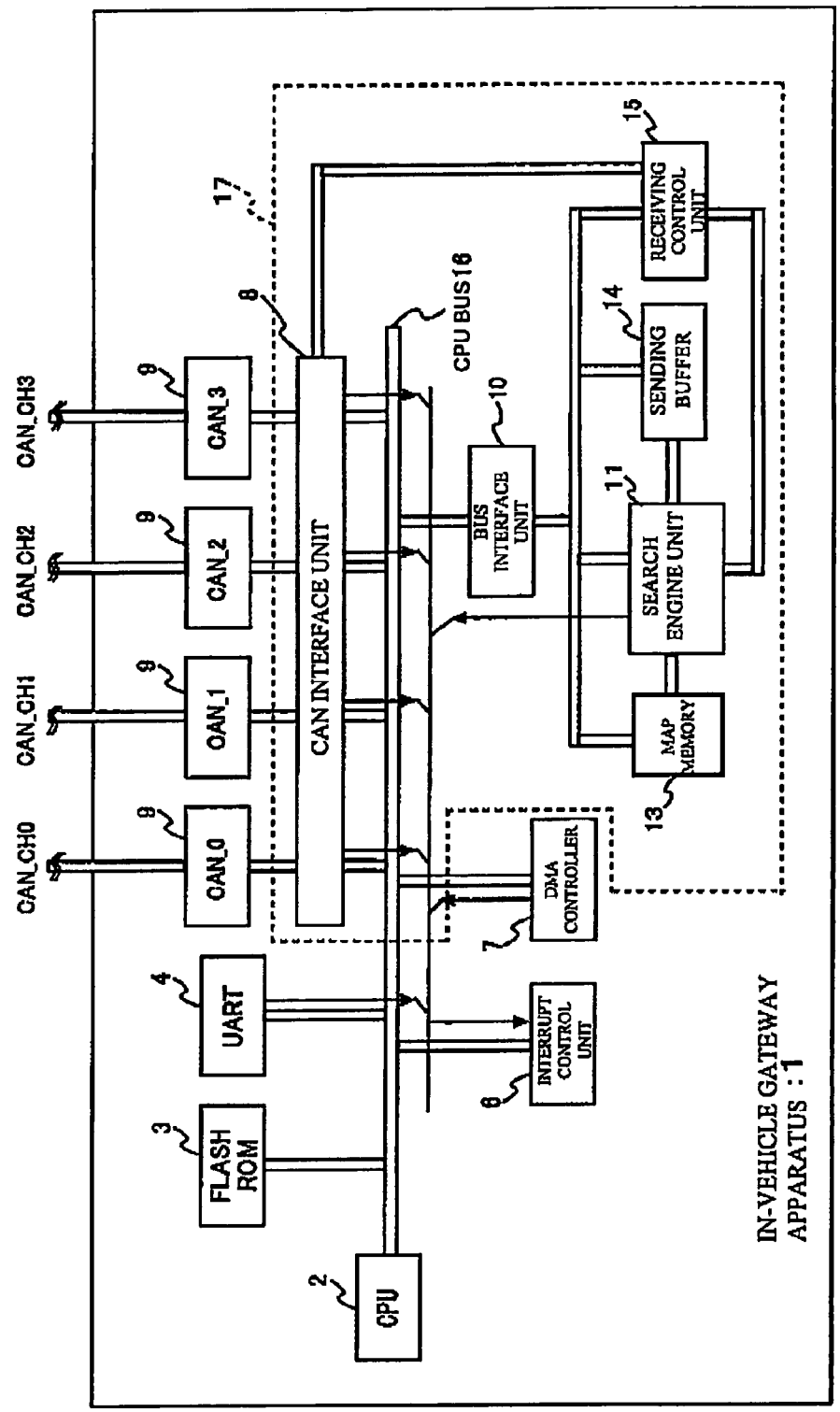
FIG. 3 is a block diagram showing a configuration of an in-vehicle gateway apparatus.

In the in-vehicle gateway apparatus 1 shown in FIG. 3, a CPU bus 16 is connected with a CPU 2, a flash read only memory (ROM) 3, a universal asynchronous receiver transmitter (UART) 4, an interrupt control unit 6, a DMA controller 7, a CAN interface unit 8, a plurality of CANs 9 (while four CAN of CAN_0, CAN_1, CAN_2 and CAN_3 are shown in a second embodiment, the number of CANs is not limited to this), a bus interface unit 10, and the like. The bus interface unit 10 is connected with a search engine unit 11, a map memory 13, a sending buffer 14 and a receiving control unit 15. The search engine unit 11, the sending buffer 14 and the receiving control unit 15 are connected by data lines which input and output data from and to the CPU bus 16 via the bus interface unit 10. Between the search engine unit 11 and the sending buffer 14 and between the search engine unit 11 and the receiving control unit 15 are also connected by data lines. The receiving control unit 15 is connected with the CAN interface unit 8 by data lines as to input data directly from the CAN interface unit 8. In FIG. 3, other than data lines, control lines which send and receive control signals are shown. The CPU 2 outputs signals for controlling the abovementioned function sections to the control lines. The control lines are also wired between the DMA controller 7 and the search engine unit 11, and the DMA controller 7, without the control by the CPU 2, reads out data from the search engine unit 11 and transfers the data to forwarding destinations. Here, the configuration having the search engine unit 11, the map memory 13, the sending buffer 14, the receiving control unit 15, the bus interface unit 10 and the CAN interface unit 8 is called a gateway hardware macro section 17.

The gateway hardware macro section 17 is mainly provided with the following functions: first, to take out frame data from a message box of the CAN 9 by using, as a trigger, an interrupt signal generated by the CAN 9 when the frame data is received; second, to route the frame data received; and third, to detect routing errors and other errors. Besides the above, a transmit function of routed data and such may be provided.

The flash ROM 3 stores data or programs used when the CPU 2 runs various processes including a data transmission process. The CPU 2 controls the whole in-vehicle gateway apparatus 1 shown in FIG. 3 and processes the transmission of the frame data routed by the search engine unit 11 by program-control. The CPU 2 performs routing to sort forwarding destinations of the frame data received, based on the programs stored in the flash ROM 3.

The UART 4 is connected with external devices and converts parallel signals sent from the external devices to serial signals, and conversely, converts serial signals sent from serial devices to parallel signals.

The interrupt control unit 6 controls outputs of interrupt signals output from the search engine unit 11 to the CPU 2. When a predefined number of frames are stored in a sending FIFO (a first storage) 21, when the sending FIFO 21 is overflowed, and when a routing error occurred in the search engine unit 11, the search engine unit 11 outputs an interrupt signal to the CPU 2. The DMA controller 7 DMA transfers frame data stored in the sending FIFO 21 routed by the search engine unit 11 without involving the CPU 2.

A plurality of CANs 9 (i.e. CAN_0, CAN_1, CAN_2 and CAN_3) is provided for each communication channel and stores the frame data received from a CAN bus (not shown) and the frame data routed by the search engine unit 11 and by the CPU 2. The routed frame data is read out from the message box and is output to the CAN bus. The CAN 9, when receiving frame data from the communication channel, outputs an interrupt signal to the search engine unit 11.

The search engine unit 11 takes out frame data from the message box of the CAN 9, with the interrupt signal output from the CAN 9 as a trigger, and stores the data to the receiving control unit 15 via the CAN interface unit 8. Thereafter, the search engine unit 11 takes out the frame data from the receiving control unit 15 by a predefined timing clock and performs processes such as routing and searching information of relay destinations of data. The search engine unit 11 is also provided with a function to detect an error occurred in the routing process. The details of a routing map stored in the map memory 13 are described later.

The sending buffer 14 stores the frame data routed by the search engine unit 11. The receiving control unit 15 stores the frame data read out from the message box of the CAN 9.

Figure 4:
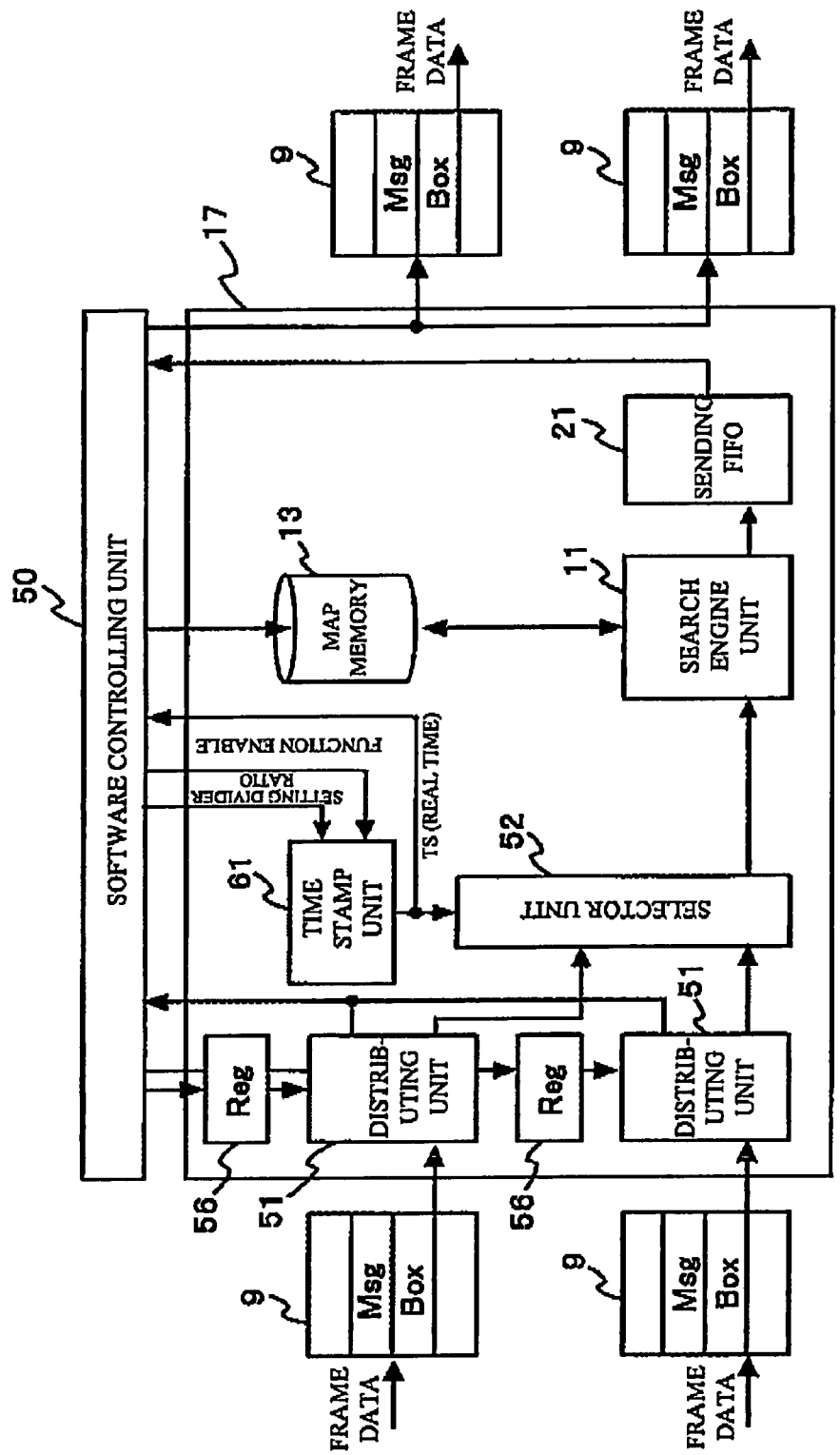
FIG. 4 is an illustration showing a configuration of a gateway hardware macro section.

Next, in reference with FIG. 4, a configuration of the gateway hardware macro section 17 is described. In the in-vehicle gateway apparatus 1 of the second embodiment, the routing of frame data is performed in parallel by a software controlling unit 50 of the CPU 2 and by the gateway hardware macro section 17 provided as hardware.

The gateway hardware macro section 17 has, as shown in FIG. 4, distributing units 51 and registers 56 provided for each communication channel, a selector unit 52, a time stamp unit 61, a search engine unit 11, a map memory 13 and a sending FIFO 21. The abovementioned parity bit summing unit 1300 and checker 1400 are provided between the search engine unit 11 and the map memory 13. Their details are described later.

As shown in FIG. 4, the distributing unit 51, which may be called routing unit, is provided for each communication channel, takes out frame data from a message box 9 of the CAN 9 and performs a sorting process of output destination of the frame data. The distributing unit 51, in reference with destination information set in the frame data, sets the forwarding destination of the frame data to any one of the software controlling unit 50, the selector unit 52 or both the software controlling unit 50 and the selector unit 52. The software controlling unit 50 is a functional section which is enabled by the program-controlled operation of the CPU 2.

Consequently, sorting output destinations of data by the unit of channels and of selected frames allows processes by the software controlling unit 50 and by the hardware in the search engine unit 11 to be preformed in parallel.

As the frame data to be sent to the software controlling unit 50 in priority is transferred without involving the search engine unit 11, the start time of the process in the software controlling unit 50 can be expedited.

The register 56 stores setting information set by the software controlling unit 50. The setting information at least contains operational setting information of an in-vehicle gateway apparatus and setting information for sorting. The distributing unit 51 sorts out frame data according to the setting information stored in the register 56. While only the distributing unit 51 operates referencing with the setting information, the selector unit 52, the search engine unit 11 and the sending FIFO 21 provided at later stages never stop operating and such by the setting information. Consequently, even if the settings of the gateway, communication channels and such are dynamically changed, the problems in that frame data being lost and such in the gateway hardware macro section 17 do not occur.

While a single piece of the search engine unit 11 is provided for a plurality of communication channels, the sending FIFO 21 is provided for each of the communication channels. In order to implement such configuration, the selector unit 52 is provided at the prior stage to the search engine unit 11. The selector unit 52 is fed with frame data from a plurality of communication channels and selects the frame data to output to the search engine unit 11. The selector unit 52 controls the timing of outputting the selected frame data to the search engine unit 11. Even when frame data is output from a plurality of communication channels simultaneously, the selector unit 52 selects the frame data by the order of priority and by the order of arrival, and controls the timing of output to the search engine unit 11. Consequently, the search engine unit 11 can be shared by a plurality of communication channels.

Figure 5:
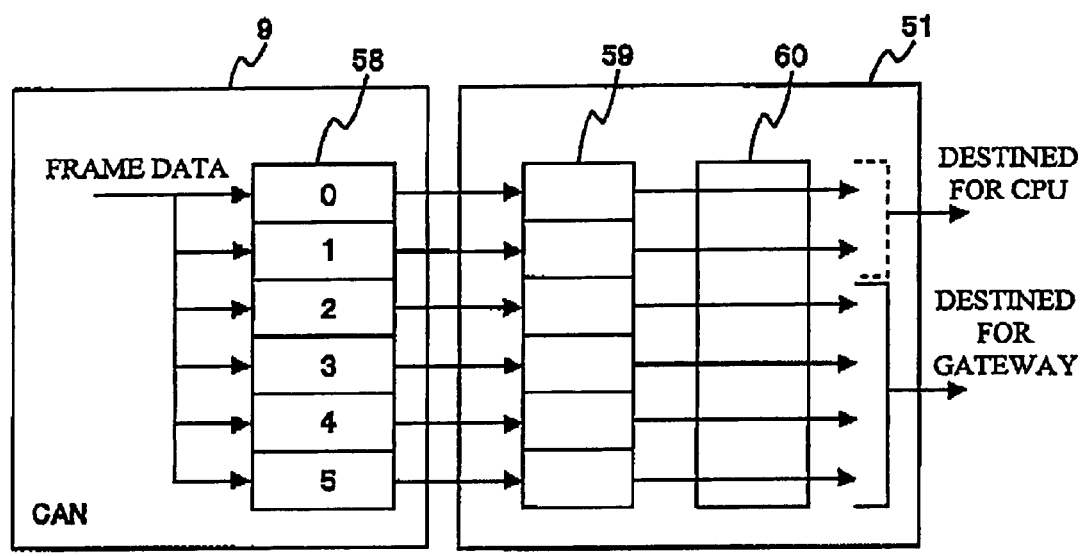
FIG. 5 is a block diagram showing a configuration of a distributing unit.

In reference with FIG. 5, the details of the distributing unit 51 are described. The distributing unit 51 has a first destination distributing unit 59 and a second destination distributing unit 60.

Frame data is sorted by a message distributing unit 58 of the CAN 9 according to an ID of the data and is registered to the message boxes (0, 1, 2, 3, and so on). The first destination distributing unit 59 sets the destination of frame data in the locations sorted by the message distributing unit 58 (i.e. the message boxes 0, 1, 2, 3, and so on) for the software controlling unit 50 or for the search engine unit 11, or sets a multi-destination transmission which sets destinations for both the software controlling unit 50 and the search engine unit 11. Some frame data is discarded here. The second destination distributing unit 60, according to the processing status of the search engine unit 11, forcibly changes the frame data which has been destined for the search engine unit 11 to the software controlling unit 50 or sets frame data to be discarded.

Figure 6:
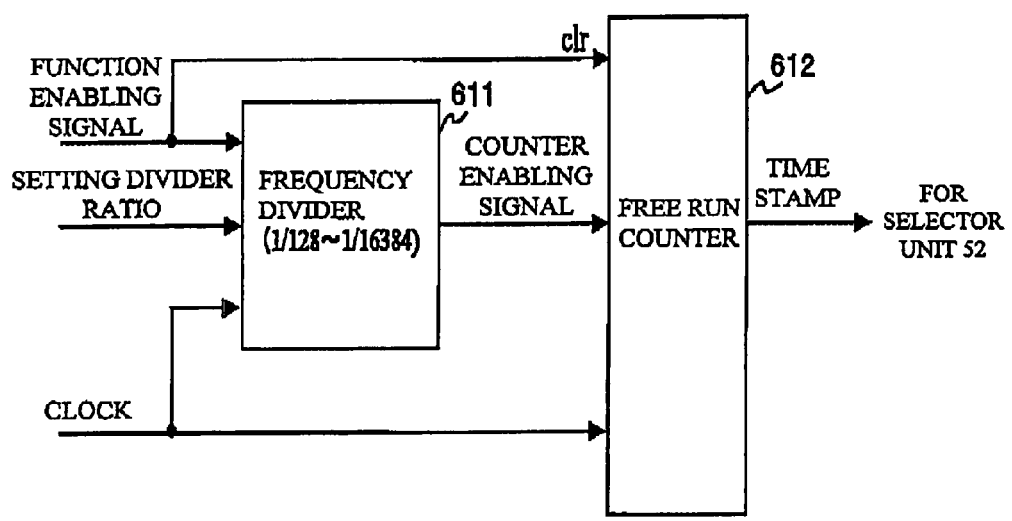
FIG. 6 is a block diagram showing a configuration of a time stamp unit.

In reference with FIG. 6, a configuration of the time stamp unit 61 is described.

The time stamp unit 61 appends time stamps to the frame data input to the selector unit 52. The time stamp unit 61, as shown in FIG. 6, is provided with a frequency divider 611 and a free running counter 612.

The frequency divider 611 is fed with a function enabling signal and a divider ratio setting signal output from the CPU 2, and a clock signal. When the function enabling signal is enabled, the frequency divider 611, outputs a counter enabling signal which is produced based on the frequency divided clock signal according to the setting of the divider ratio setting signal to the free running counter 612.

The free running counter 612 is fed with the clock signal, the counter enabling signal output from the frequency divider 611 and the function enabling signal from the CPU 2. The free running counter 612, when the function enabling signal is enabled, outputs a time stamp by counting the counter enabling signal output from the frequency divider 611.

For example, when the clock frequency is at 16 MHz and the free running counter is a 16-bit counter, with the frequency dividing setting of $1/128$, the minimum measurable time becomes 8 μs and the maximum measurable time becomes 0.524 seconds. When the frequency dividing setting is $1/16384$, the minimum measurable time becomes 1.024 ms and the maximum measurable time becomes 67.1 seconds.

Figure 7:
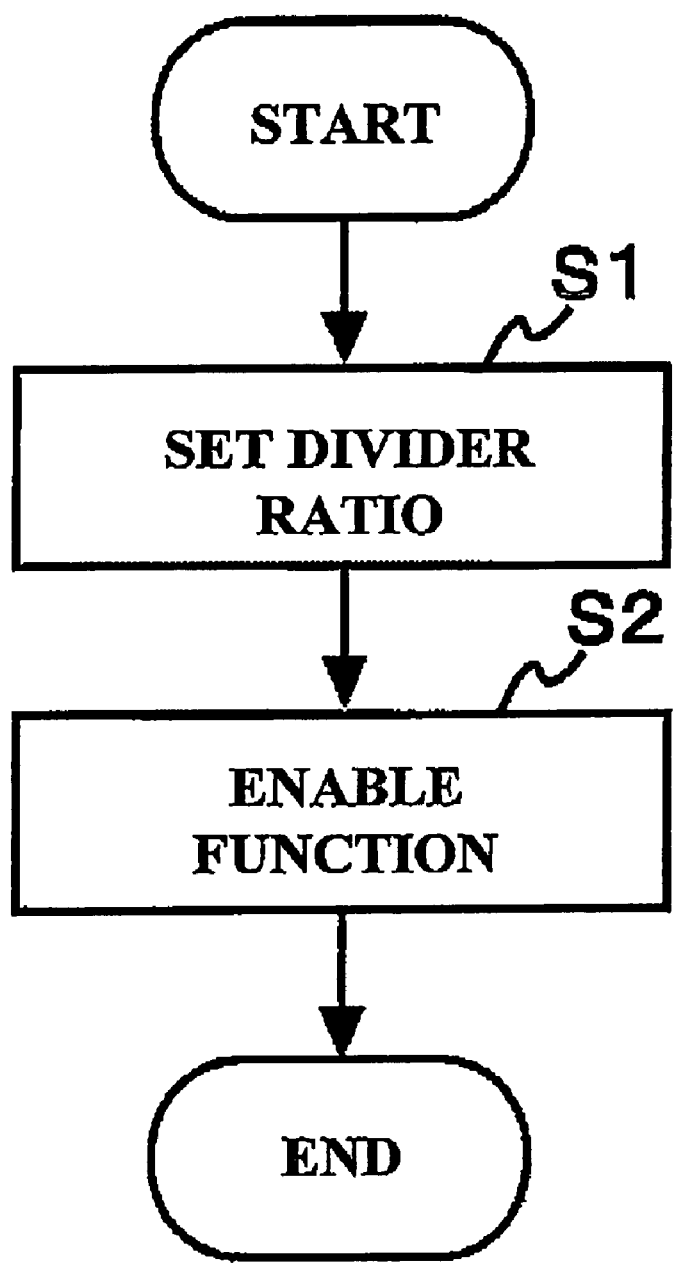
FIG. 7 is a flowchart showing a procedure of an initial setting process of the time stamp unit by a CPU.

In reference with a flowchart shown in FIG. 7, a procedure for the initial setting of the time stamp unit 61 by the CPU 2 is described.

At an initial operation, the CPU 2 sets, for the time stamp unit, the divider ratio according to the range to be measured and resolution (step S1), and thereafter, sets the function enabling signal enable and activates the time stamp unit 61 (step S2).

Figure 8:
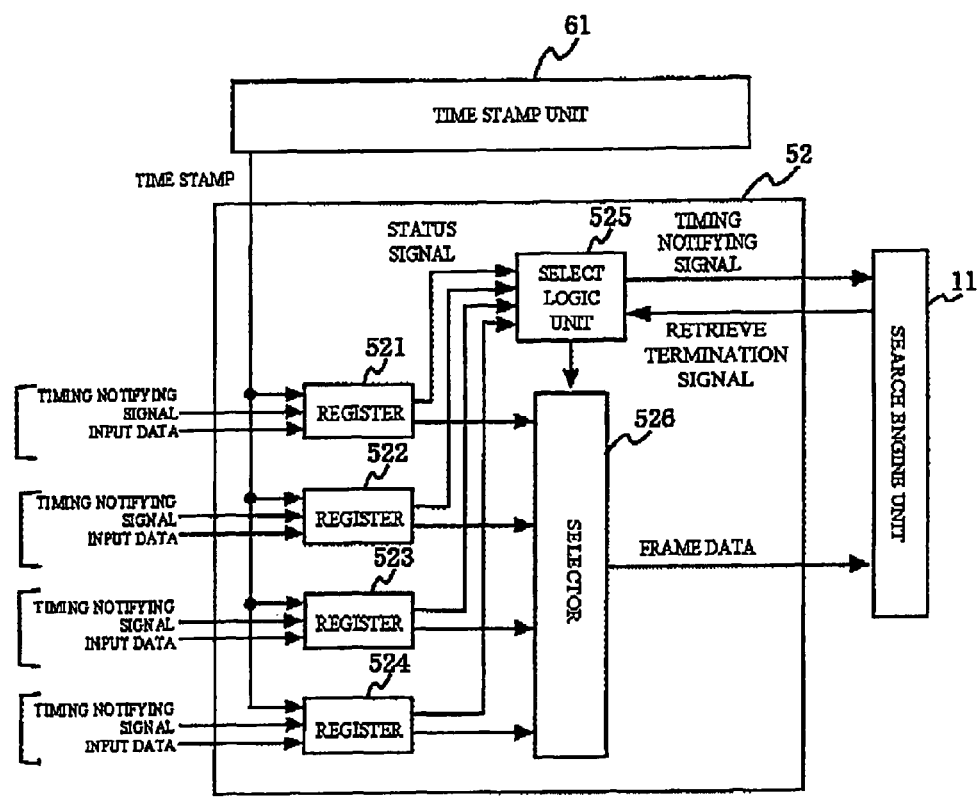
FIG. 8 is a block diagram showing a configuration of a selector.

In reference with FIG. 8, a configuration of the selector unit 52 is described. The selector unit 52 has registers 521, 522, 523 and 524 provided for each communication channel, and a select logic unit 525 and a selector 526.

The registers 521, 522, 523 and 524 are fed with frame data from each channel, timing notifying signals to notify the input timing of frame data to respective registers 521, 522, 523 and 524, and a time stamp issued by the time stamp unit 61. The time stamp issued by the time stamp unit 61 is appended to the frame data in the registers 521, 522, 523 and 524.

The registers 521, 522, 523 and 524 output, to the select logic unit 525, a status signal which indicates whether the valid frame data is held in the registers 521, 522, 523 and 524 or not. The registers 521, 522, 523 and 524 output the frame data, to which the time stamp is appended, to the selector 526 at a predefined timing. The select logic unit 525 outputs, to the selector 526, a select instruction signal that selects the frame data to be output, based on the status signals from the registers 521, 522, 523 and 524. The selector 526 selects the frame data according to the select instruction signal from the select logic unit 525, and thereafter, outputs the frame data to the search engine unit 11 in a subsequent stage.

Figure 9:
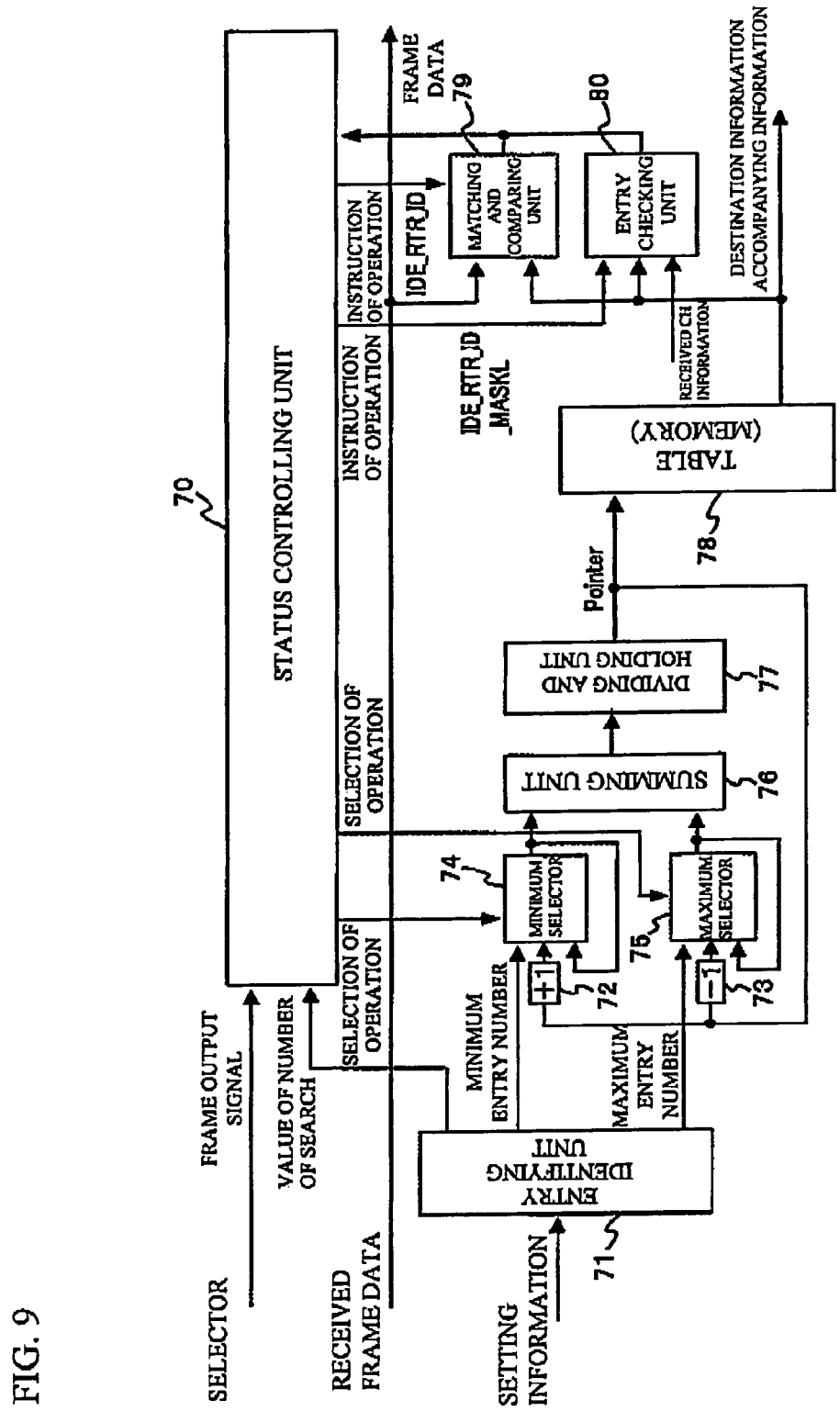
FIG. 9 is a block diagram showing a configuration of a search engine unit.

In reference with FIG. 9, the details of the configuration of the search engine unit 11 are described. The search engine unit 11 is provided with a status controlling unit 70, an entry identifying unit 71, a number summing unit 72, a number subtractor 73, a minimum selector 74, an maximum selector 75, an summing unit 76, a dividing and holding unit 77, a table 78 configured in memory, a matching and comparing unit 79 and an entry checking unit 80.

The status controlling unit 70 is fed with a frame output signal from the selector unit 52 and controls all functional sections shown in FIG. 9. The status controlling unit 70 controls to search the table 78 for the predetermined number of times according to a number of times to search which is input from the entry identifying unit 71.

Figure 10:
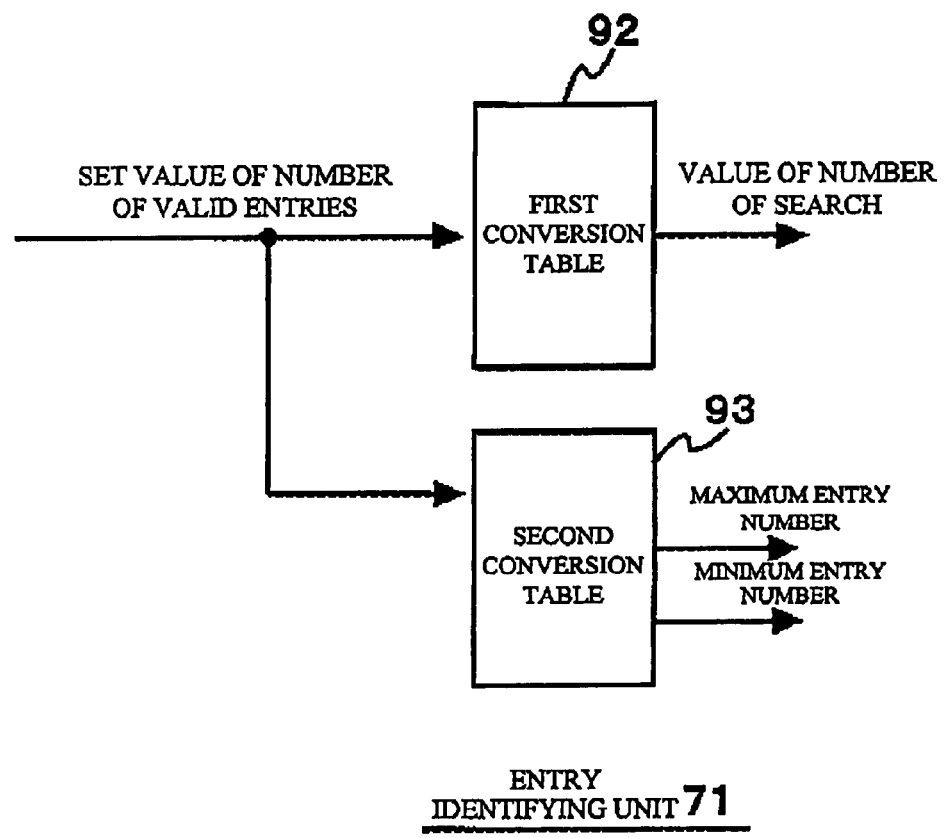
FIG. 10 is a block diagram showing a configuration of an entry identifying unit.

A configuration of the entry identifying unit 71 is shown in FIG. 10. The entry identifying unit 71 has a first conversion table 92 and a second conversion table 93. A set value of a number of valid entries entered to the first conversion table 92 represents the number of entries registered in a routing map which is referenced in destination search.

The first conversion table 92 calculates a value of number of search which sets the number of times to search the memory 78 from the set value of a number of valid entries. For example, when the number of entry for a channel is 256 entries (nodes), as 256 is the eighth power of 2, the number of times to search becomes 9 times by adding a value of +1.

The second conversion table 93 is fed with the set value of a number of valid entries and outputs a maximum entry number and a minimum entry number. The minimum entry number is the least number of ID numbers of the nodes registered (0), and similarly, the maximum entry number represents the greatest number of the ID numbers of the nodes registered (the set value of a number of valid entries). The minimum entry number is output to the minimum selector 74 and the maximum entry number is output to the maximum selector 75. The value of number of search is output to the status controlling unit 70.

The minimum selector 74 is fed with the minimum entry number from the entry identifying unit 71. The minimum selector 74 selects and outputs any one of the aforementioned minimum entry number, the previous entry number, or the entry number derived from the output of the dividing and holding unit 77 with an added value of +1, according to the control of the status controlling unit 70.

Similarly, the maximum selector 75 is fed with the maximum entry number from the entry identifying unit 71. The maximum selector 75 selects and outputs any one of the aforementioned maximum entry number, the previous entry number, or the entry number derived from the output of the dividing and holding unit 77 with an added value of −1, according to the control of the status controlling unit 70.

The summing unit 76 adds the entry number of the minimum selector 74 and the entry number of the maximum selector 75. The dividing and holding unit 77 divides the added value of the summing unit 76 by 2 and holds the result of the division.

Figure 11:
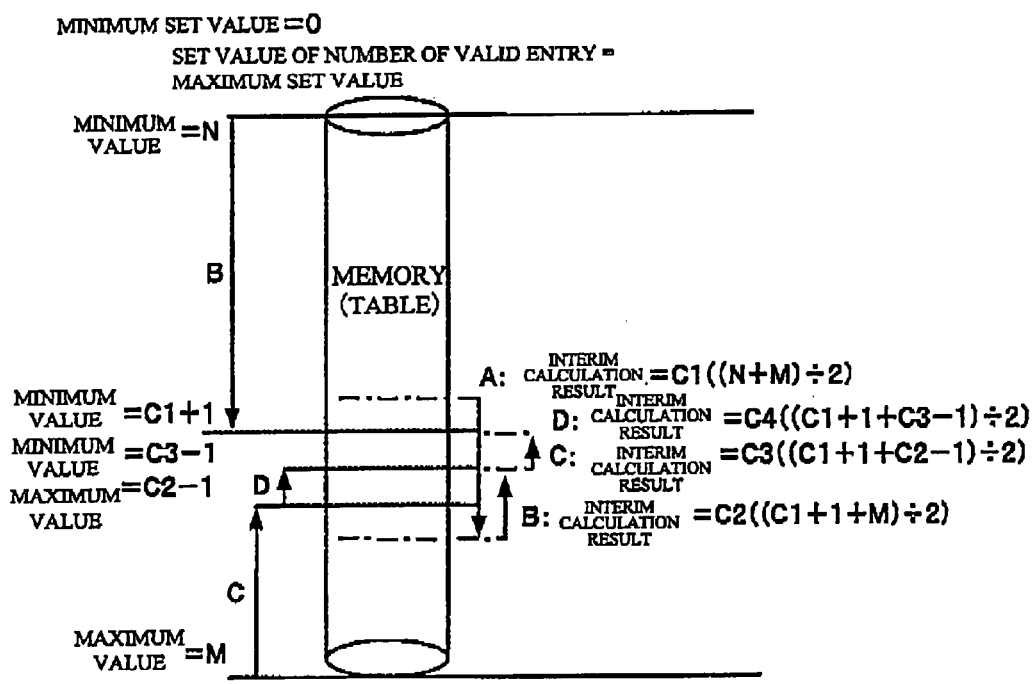
FIG. 11 is an illustration diagram of a binary tree search.

In reference with FIG. 11, a search method of the second embodiment is described. In the second embodiment, a binary tree search is used. FIG. 11 illustrates the concept of a method of the binary tree search. A minimum set value of a memory which the channel subject to search uses is set as N and that of a maximum set value is set as M. To simplify the explanation, the set value of a number of valid entries is set as the maximum set value and the minimum set value is set as the value of 0.

In the binary tree search, an intermediate value between the maximum set value and the minimum set value is calculated first. More specifically, an equation of $(N+M)/2=C1$ is calculated, and the entry data at this address is compared with an ID of the received data. For example, when an ID of received data is smaller than the entry data, this entry data is assumed to be registered at a higher memory address. Consequently, the minimum selector 74 selects the value of the previous value C1 held by the dividing and holding unit 77 with an added value of +1. The maximum selector 75 selects the previous value of M as is. These controls are carried out by the status controlling unit 70. As these values are added by the summing unit 76 and divided by 2 by the dividing and holding unit 77, the equation of $(C1+1+M)/2=C2$ is calculated. By a large-or-small comparison of the entry data obtained in this way with the received ID, the next address is generated in sequence and the entry data which matches the ID of the received data is searched from the memory 78.

The entry checking unit 80 judges whether the entry data read out from the table 78 is normal data or not. The judged result is output to the status controlling unit 70.

Figure 12:
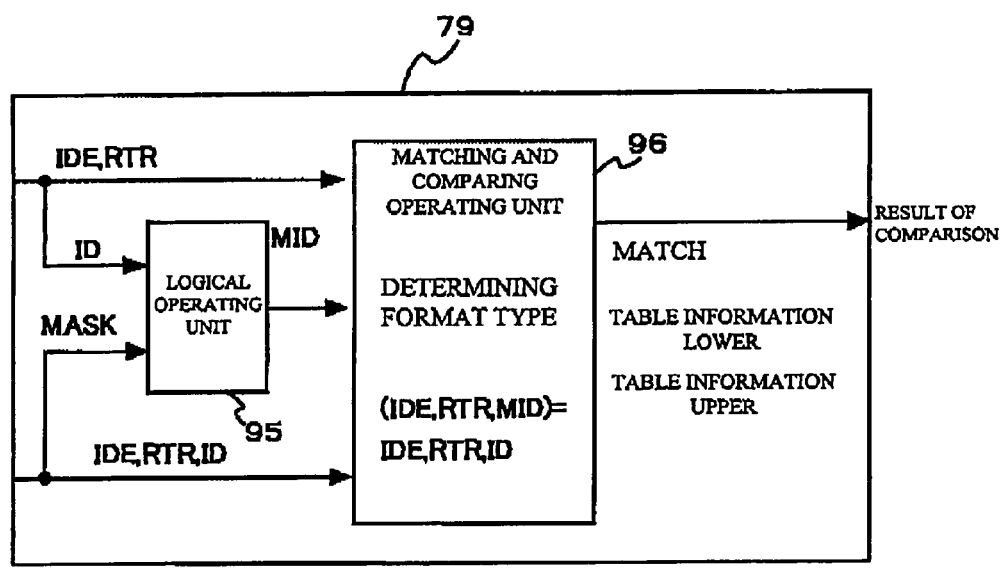
FIG. 12 is a block diagram showing a configuration of a matching and comparing unit.
Figure 13:
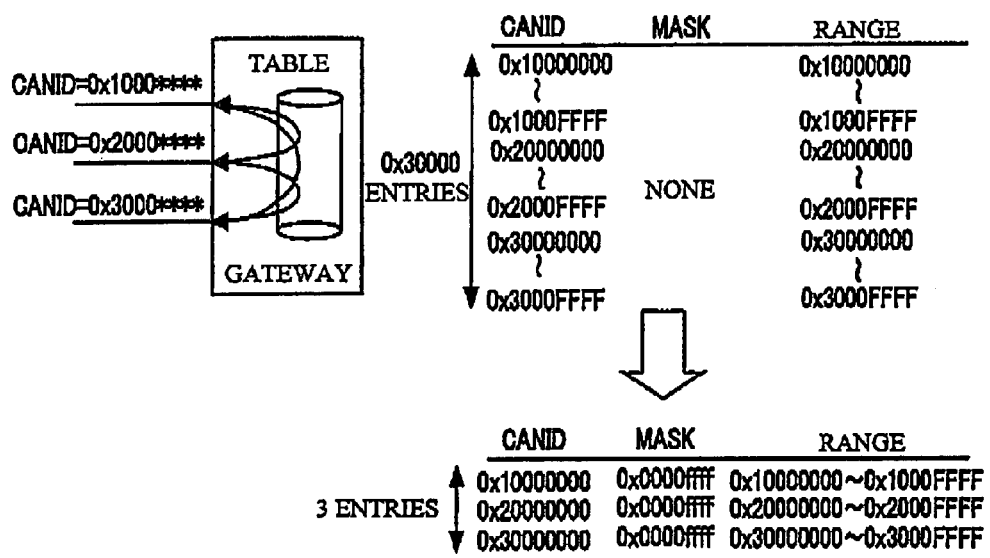
FIG. 13 is an illustration diagram of a masking process.

The matching and comparing unit 79 compares an entry data read out from the table 78 with an ID of received data. In FIG. 12, a configuration of the matching and comparing unit 79 is shown. As shown in FIG. 12, the matching and comparing unit 79 is provided with a logical operating unit 95 and a match comparison operator 96. The logical operating unit 95 refines search ranges by superposing a mask over an ID of received data as shown in FIG. 13. The matching and comparing unit 79 compares the mask superposed ID number with the entry data read out and judges whether the both match or not.

Figure 14:
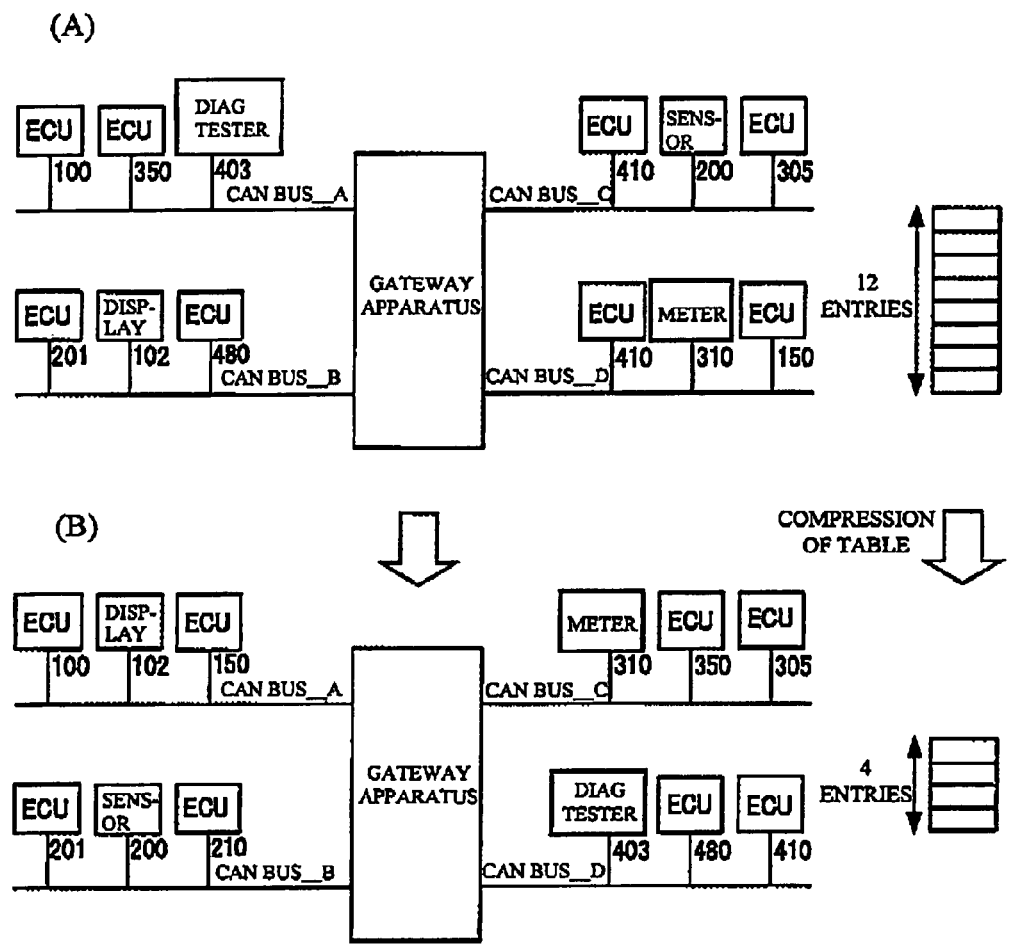
FIG. 14 is another illustration diagram of the masking process.

For example, as shown in part (A) of FIG. 14, when random ID numbers (the values shown in the drawing represent ID numbers) are given to nodes of four CAN buses A, B, C, and D connected with the gateway apparatus 1, the match of the ID must be detected by the maximum comparisons of 12 times. On the contrary, as shown in part (B) of FIG. 14, by setting the same values to a few upper bits for the nodes on the same bus, it is possible to determine which channel the data comes from by comparisons of four times.

Figure 15A:
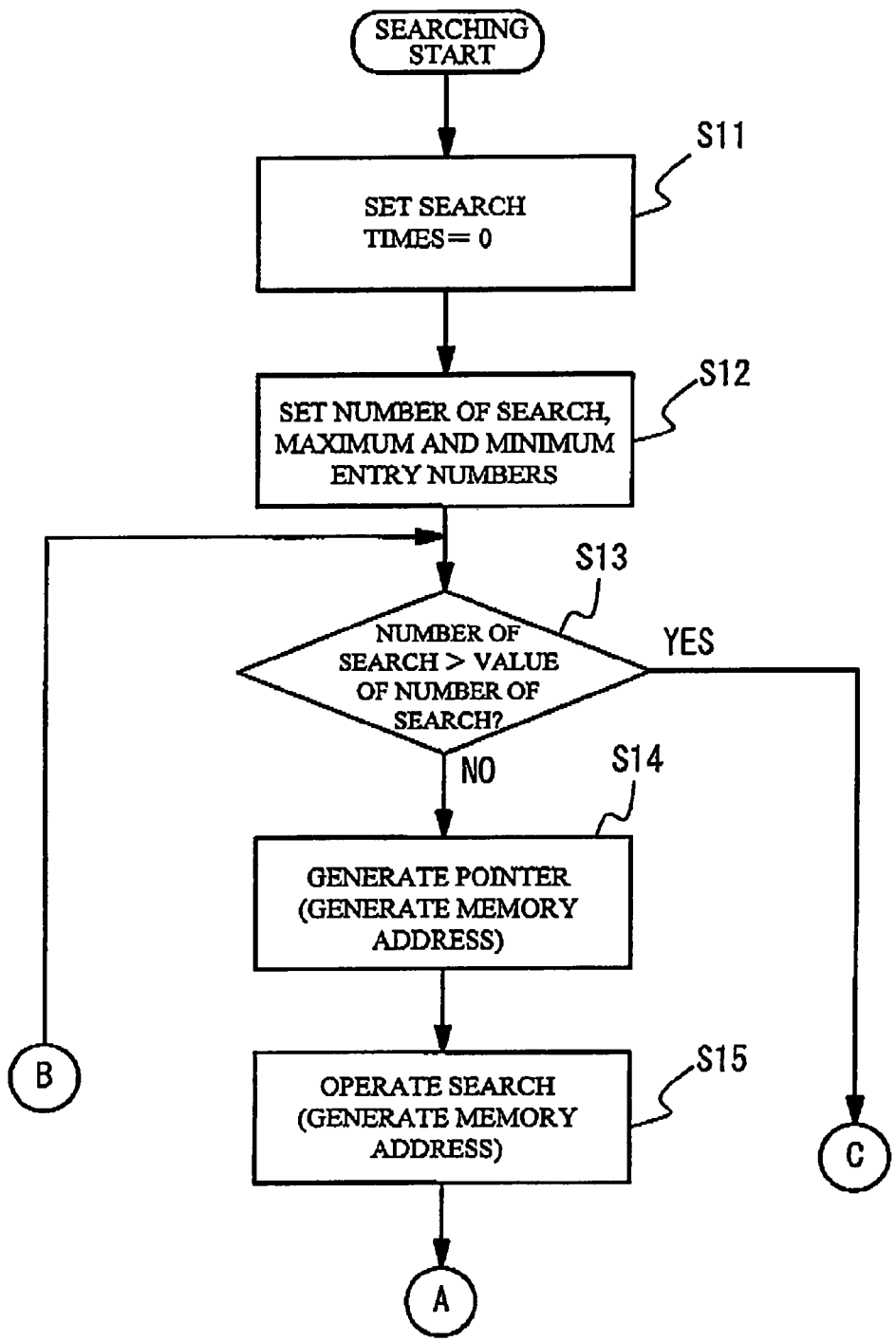
FIGS. 15A and 15B are flowcharts showing a processing procedure of the search engine unit.
Figure 15B:
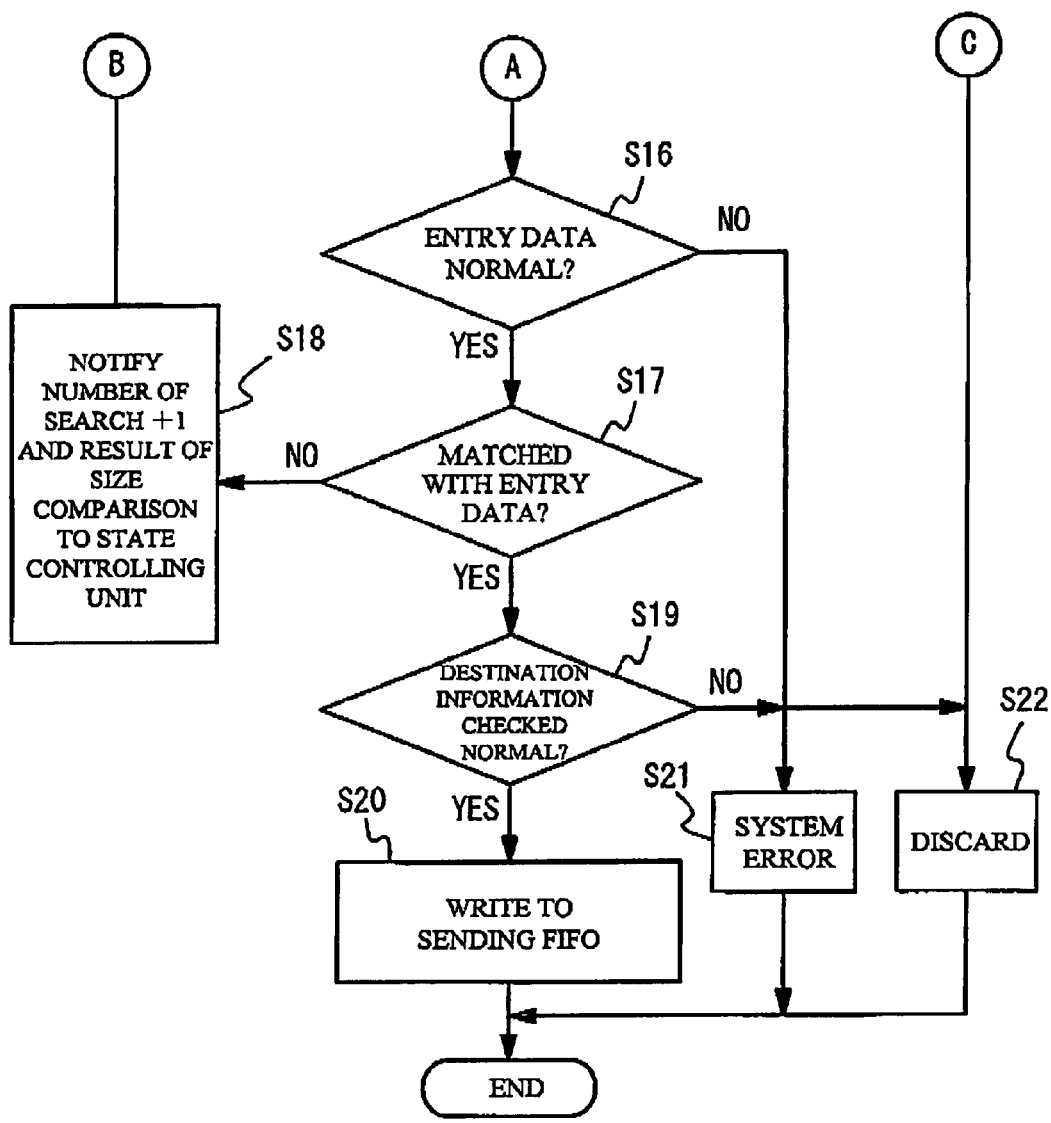

In reference with flowcharts shown in FIGS. 15A and 15B, a processing procedure of the search engine unit 11 is described.

When search is started, the status controlling unit 70 first sets the search time to a value of 0 (step S11). In synchronous with this process, the entry identifying unit 71 sets the value of number of search according to the number of entries (step S12). The value of number of search is notified from the entry identifying unit 71 to the status controlling unit 70.

The status controlling unit 70 compares the number of search times with the value of number of search notified from the entry identifying unit 71 (step S13), and when the number of search times is less than the value of number of search (step S13; YES), based on an initial value or the information of a previous large-or-small comparison, a pointer address of a memory is generated (step S14). The minimum selector 74 is fed with a minimum entry number from the entry identifying unit 71. Similarly, the maximum selector 75 is fed with an maximum entry number from the entry identifying unit 71. The summing unit 76 adds the minimum entry number and the maximum entry number. The dividing and holding unit 77 divides the added value by 2 and holds the result. The result value becomes an address of the pointer.

When an address of the pointer is generated, the entry data represented by the pointer address is read out from the memory 78 (step S15). The read out entry data is fed to the entry checking unit 80 and is judged whether the data is normal or not (step S16). When the value is not normal (step S16; NO), it is processed as a system error. When the entry data is normal (step S16; YES), whether the ID of the received data matches with the entry data or not is judged by the matching and comparing unit 79 (step S17). In case the both do not match (step S17; NO), the number of search times is incremented and the result of the large-or-small comparison in the matching and comparing unit 79 is output to the status controlling unit 70 (step S18), and steps in and following the step S13 are repeated. The status controlling unit 70, according to the result of the large-or-small comparison, controls the minimum selector 74 and the maximum selector 75, and the pointer address corresponding to the result of the previous comparison is generated. Meanwhile, when the both match (step S17; YES), the destination information of the matched entry data is checked (step S19), and when normal, is written to the sending FIFO 21 (step S20). In case the destination information is not normal (step S19; NO), either it is processed as a system error (step S21) or the frame data is discarded (step S22). Further, the status controlling unit 70, when the number of search times becomes greater than the value of number of search (step S13; YES), discards the frame data received (step S22).

Figure 16A:
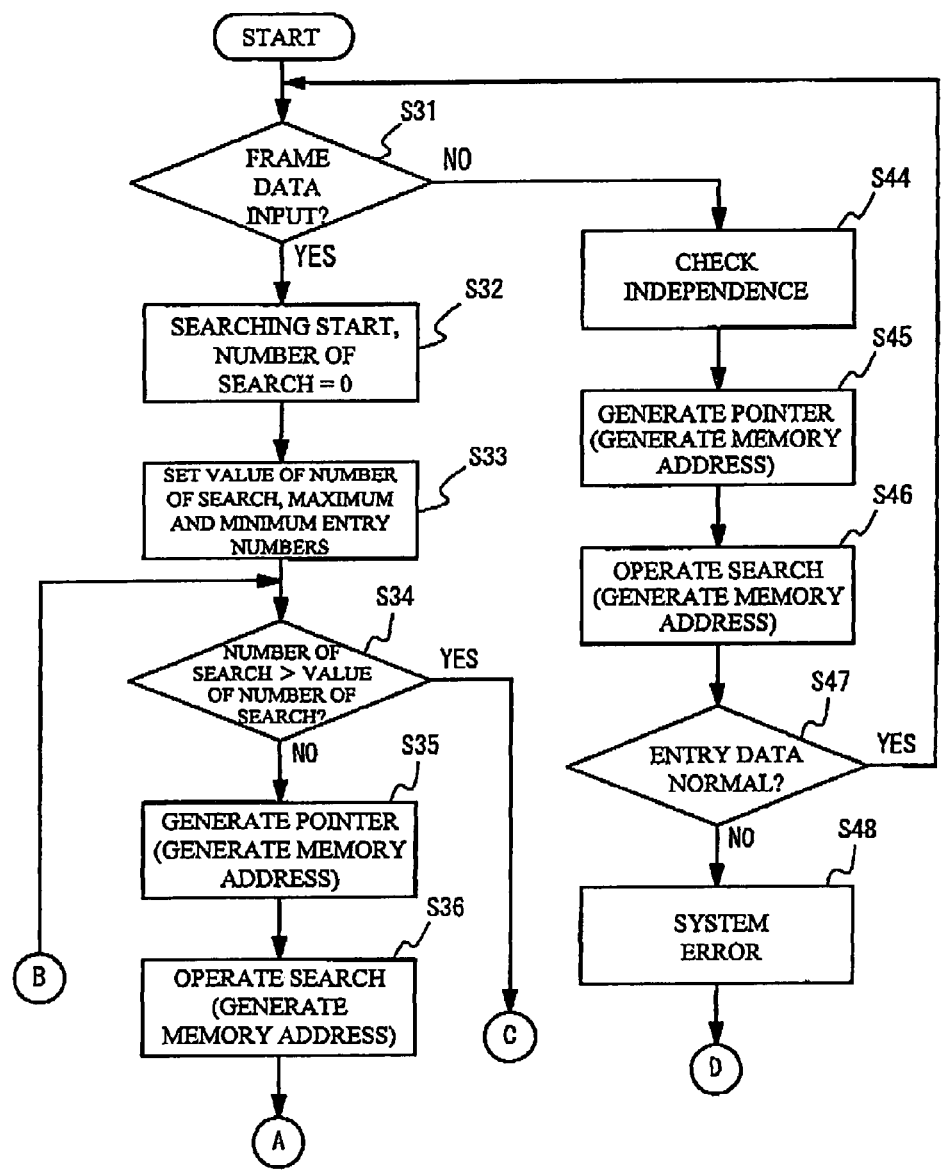
FIGS. 16A and 16B are flowcharts showing a processing procedure particularly of a self-checking process of the search engine unit.
Figure 16B:
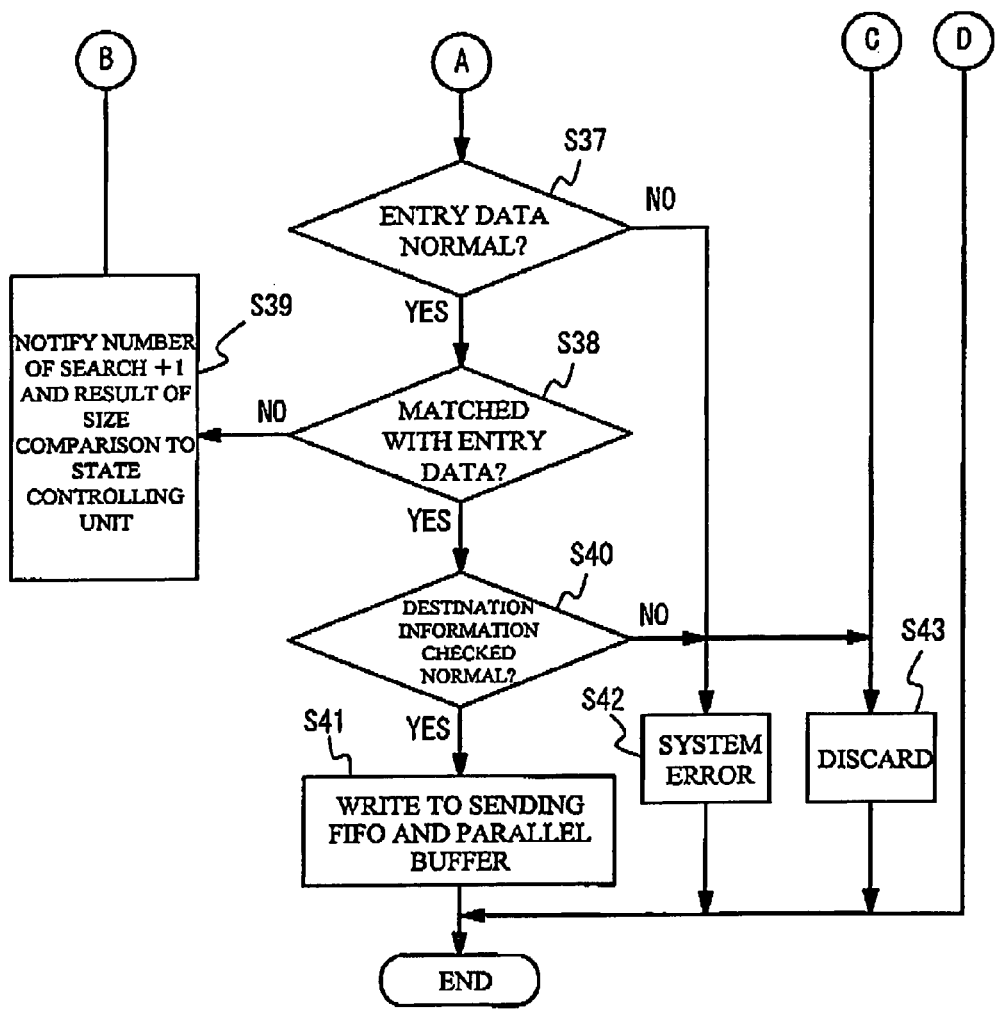

The status controlling unit 70, while being in an idle state not receiving any frame data, may conduct a normality confirmation operation for map information. This process is described in reference with flowcharts shown in FIGS. 16A and 16B.

The status controlling unit 70, while being in the idle state not receiving any frame data (step S31), conducts a self-check (step S44). The status controlling unit 70 generates a pointer address (step S45) first, and searches the entry data stored in the corresponding address and takes out the data (step S46). Thereafter, the normality of entry data taken out is judged (step S47). When the searched entry data is judged as normal (step S47; YES), the process is finished. When an error is detected (step S47; NO), it is processed as a system error (step S48).

Figure 17:
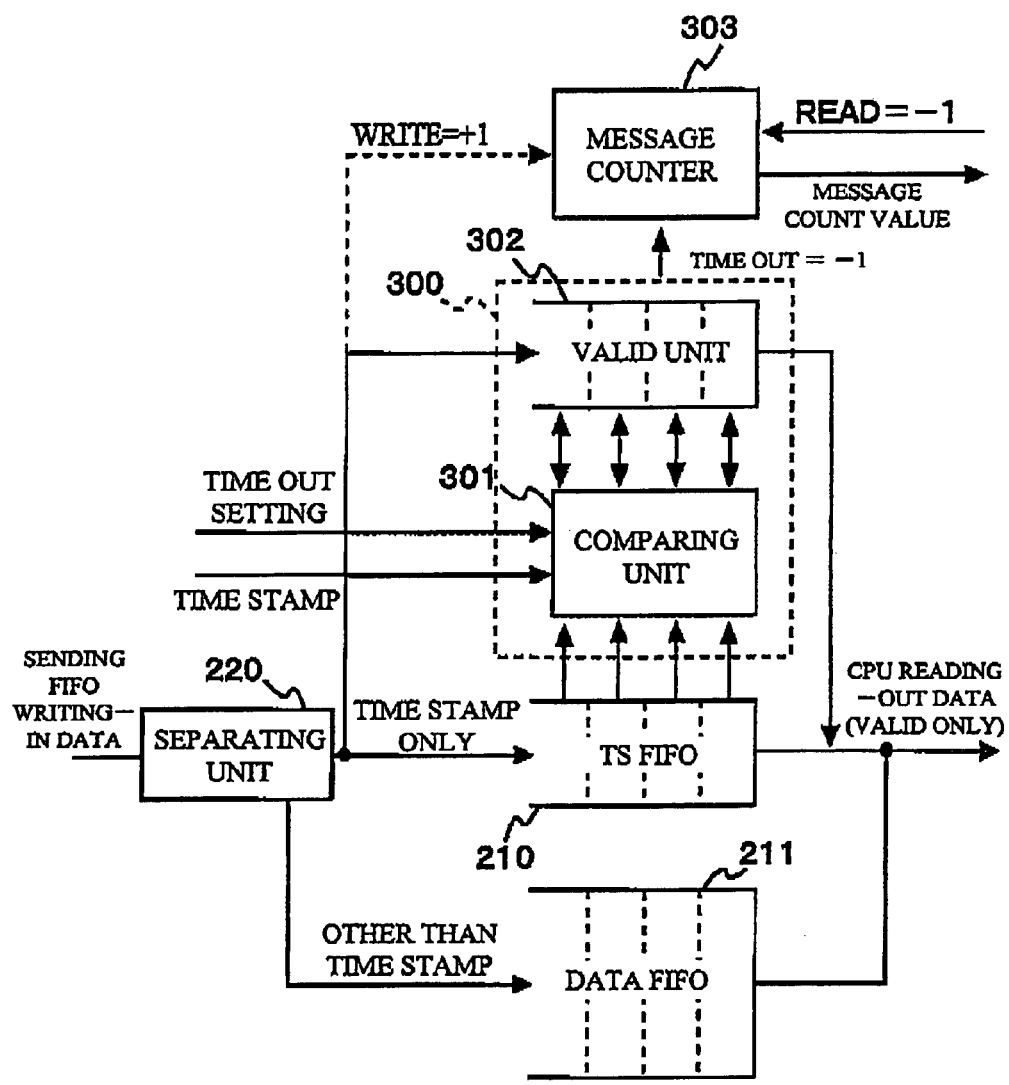
FIG. 17 is a block diagram showing configurations of a sending FIFO and a data discarder that discards invalid frame data.

FIG. 17 shows a configuration of the sending FIFO 21 and that of discarding frame data according to a delay time in the process of frame data.

As shown in FIG. 17, the sending FIFO 21 is provided with a time stamp FIFO 210 which stores a time stamp and a data FIFO 211 which stores frame data. A data discarder 300 that discards data according to a delay time in process is provided with a comparing unit 301 and a valid unit 302.

The time stamp added frame data output from the search engine unit 11 is separated to a time stamp and an area other than the time stamp by a separating unit 220, and are respectively held in the time stamp FIFO 210 (hereinafter abbreviated also as TS FIFO) and the data FIFO 211. The separating unit 220 takes out the time stamp inserted at a predefined location of frame data and outputs to the TS FIFO 210.

The valid unit 302 stores validation data, where a value of 1 is stored for the valid data, which represents the data held in the time stamp FIFO 210 and in the data FIFO 211 valid.

The comparing unit 301 is fed with a time stamp and timeout setting information. The time stamp is the information representing the current time issued by the time stamp unit 61. The timeout setting information is the information set by the CPU 2 and is the setting of a permissible delay time to take for frame data entered in the gateway hardware macro section 17 to be output from the gateway hardware macro section 17.

The valid unit 302, the time stamp FIFO 210 and the data FIFO 211 are respectively configured with a FIFO of the same configuration.

Therefore, the time stamp information of the frame data written to the data FIFO 211 is written to the same area of the time stamp FIFO 210. Similarly, the validation data that represents whether the frame data being valid data or invalid data is written to the same area of the valid unit 302.

The comparing unit 301 reads out the time stamp in the area where the data representing being valid is stored in the valid unit 302 from the TS FIFO 210, and compares that with the time stamp information representing the current time output from the time stamp unit 61. When the difference between the time in the time stamp stored in the TS FIFO 210 and the current time exceeds the timeout setting information notified from the CPU 2, the comparing unit 301 changes validation data in the valid unit 302 to that of invalid data, i.e. stores a value of 0. When the validation data is changed to that of invalid data, the value in a message counter 303 is subtracted by a value of 1.

The CPU 2 reads out the value of the message counter 303 at a predefined timing. When the value of the message counter 303 becomes a predefined value, the CPU 2 reads out the frame data from the data FIFO 211. In this case, the frame data for which the data representing being invalid is stored in the valid unit 302 is discarded without being read out.

Figure 18:
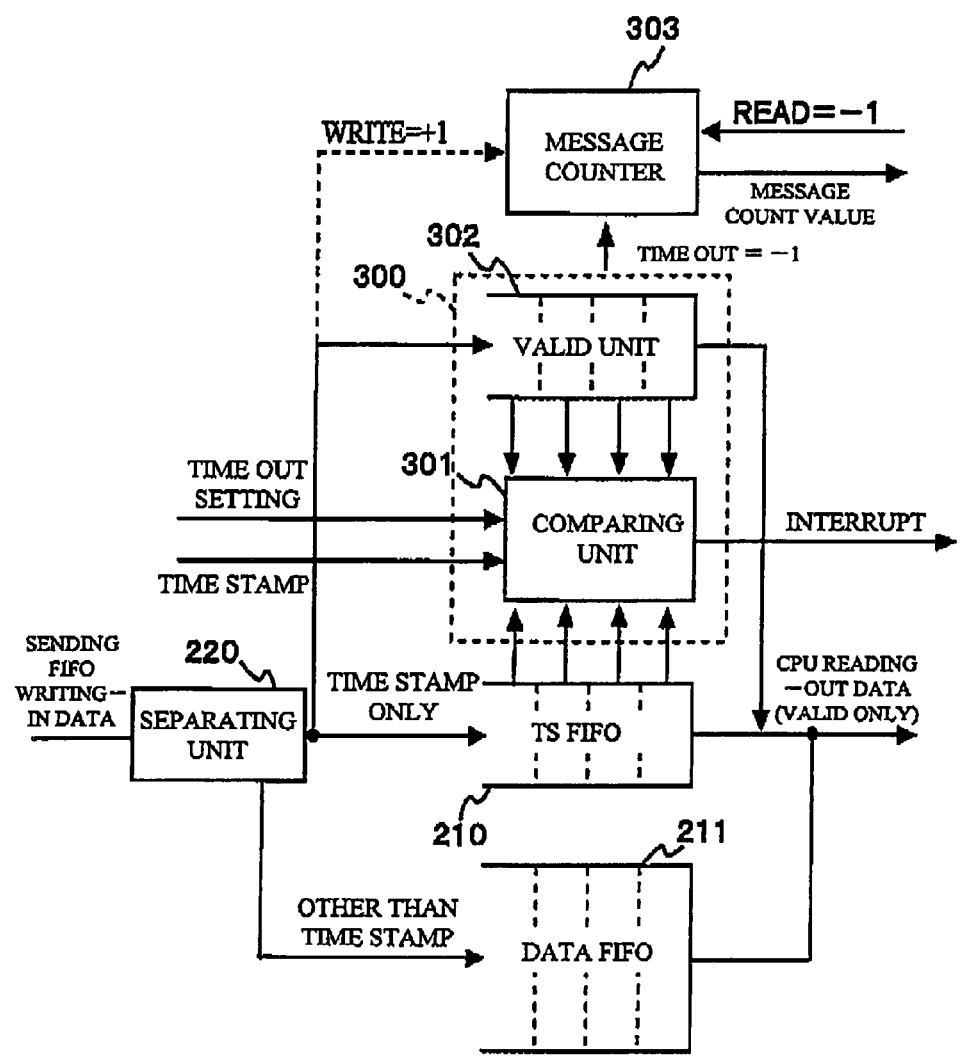
FIG. 18 is a block diagram showing another configurations of the sending FIFO and the data discarder that discards invalid frame data.

When the difference between the time in the time stamp stored in the TS FIFO 210 and the current time exceeds the timeout setting information notified from the CPU 2, the comparing unit 301 may be configured to output an interrupt signal to the CPU 2. This configuration is shown in FIG. 18. When the CPU 2 is fed with the interrupt signal, it reads out the frame data stored in the data FIFO 211 in priority.

In FIGS. 17 and 18, the configurations of discarding the frame data whose dwell time in the gateway hardware macro section 17 exceeded the timeout time by hardware are shown. However, other than those, by the software control of the CPU 2, the frame data whose dwell time exceeded the timeout time may be discarded by software.

Figure 19:
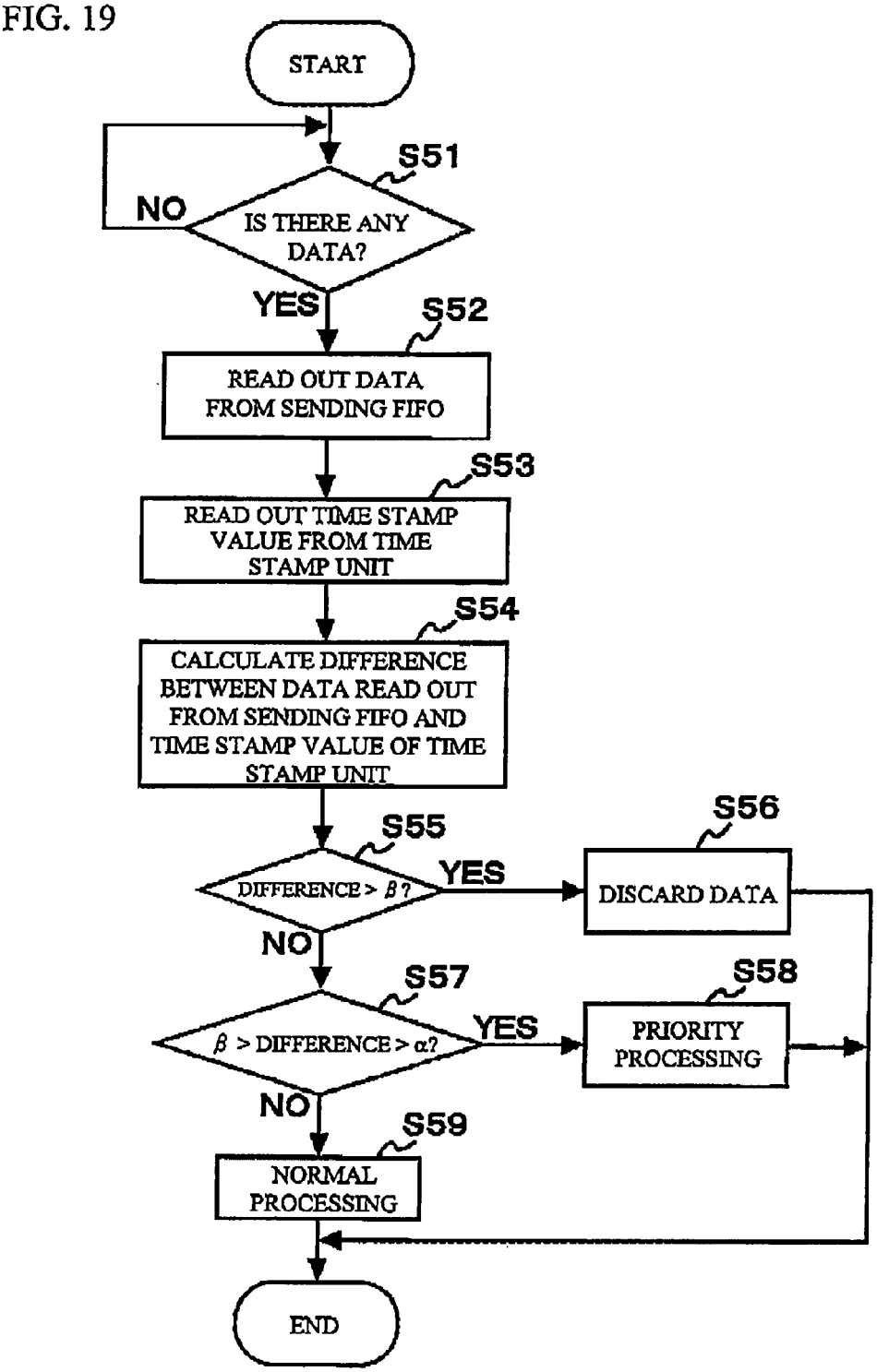
FIG. 19 is a flowchart showing a procedure of discarding invalid frame data process by the CPU.

In reference with a flowchart shown in FIG. 19, a procedure of discarding the frame data whose dwell time exceeded the timeout time by the CPU 2 is described.

The CPU 2 references with the message counter 303 at a predefined time interval and judges whether processing data is stored in the sending FIFO 21 (step S51). When processing data is stored in the sending FIFO 21 (step S51; YES), the CPU 2 reads out the processing data from the sending FIFO 21 (step S52) and reads out the time stamp information representing the current time from the time stamp unit 61 (step S53).

The CPU 2 compares the time stamp information appended to the frame data read out from the sending FIFO 21 with the current time information read out from the time stamp unit 61 (step S54).

When the difference between the time in the time stamp and the current time is greater than a first criterion value $\beta$ (step S55; YES), the frame data is discarded (step S56). When the difference between the time in the time stamp and the current time is smaller than the first criterion value $\beta$ and is greater than a second criterion value $\alpha$ (step S57; YES), the CPU 2 judges that the process of the frame data is delayed and processes the frame data in priority (step S58). The first criterion value $\beta$ is set as a greater value than that of the second criterion value $\alpha$.

When the difference between the time in the time stamp and the current time is smaller than the second criterion value $\alpha$ (step S57; NO), the CPU 2 judges that the process of the frame data is not delayed and processes normally (step S59).

In FIGS. 20A through 20D, configurations of the frame data transferred in the gateway hardware macro section 17 are shown. FIG. 20A shows the configuration of the frame data input to the selector unit 52. FIG. 20B shows the configuration of the frame data with a time stamp appended output from the selector unit 52 to the search engine unit 11. FIG. 20C shows the configuration of the frame data with the time stamp appended written to the sending FIFO 21. FIG. 20D shows the configuration of the frame data which the CPU 2 reads out from the sending FIFO 21. The asterisk mark shown in FIGS. 20B through 20D represents being composed of a plurality of bits.

Figure 21:
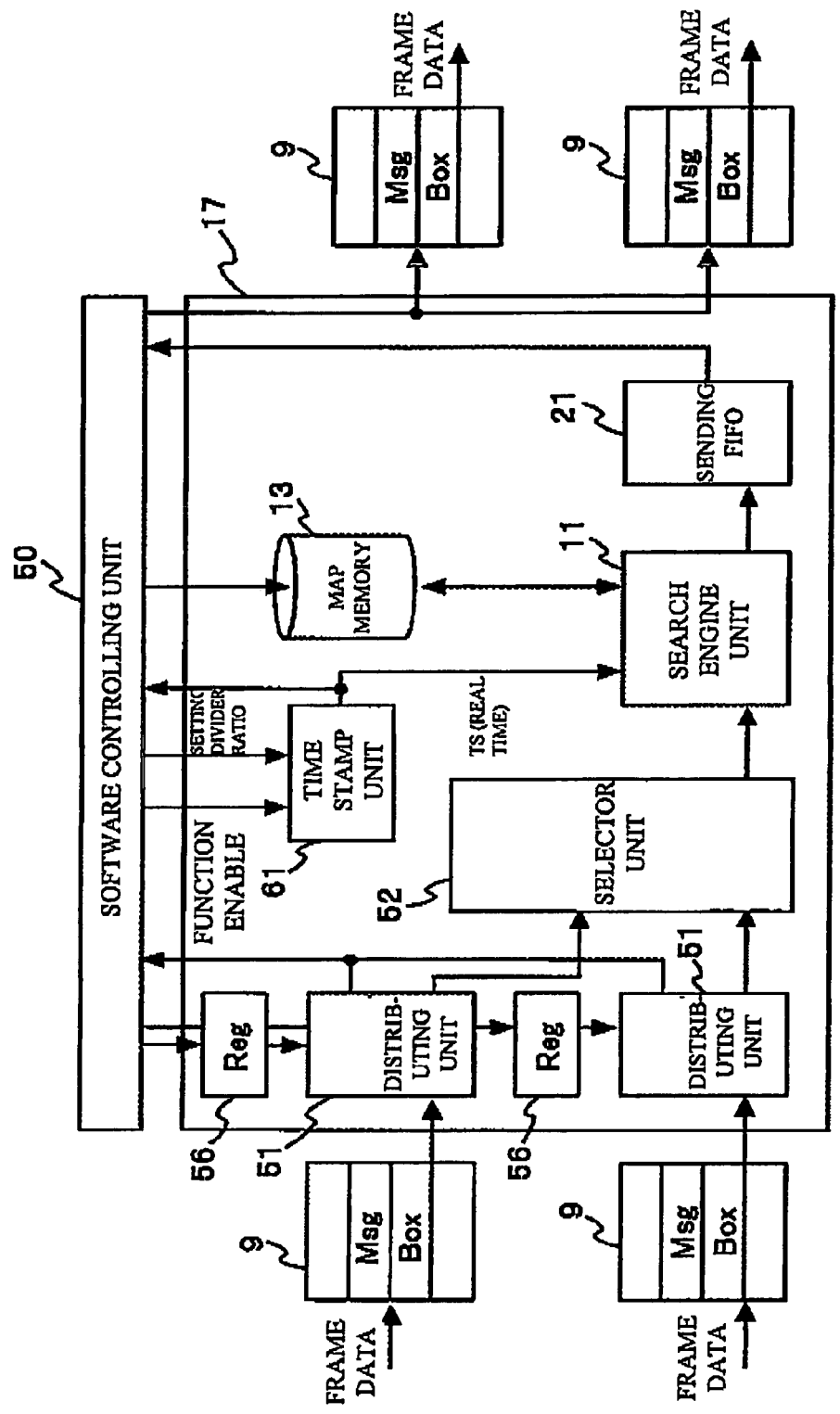
FIG. 21 is an illustration showing another configuration of the gateway hardware macro section.

The time stamp information appended to frame data may be appended only to the data judged as valid frame data by the search engine unit 11. FIG. 21 shows the configuration in that case. In view of measuring a dwell time in the gateway hardware macro section 17, while the configuration in FIG. 4 measures the strict dwell time, the configuration shown in FIG. 21 allows the scale of hardware to be small.

While discarding frame data is mainly performed by discarding by software, when discarding by hardware, the configuration becomes as shown in the drawing in FIG. 18.

Figure 22:
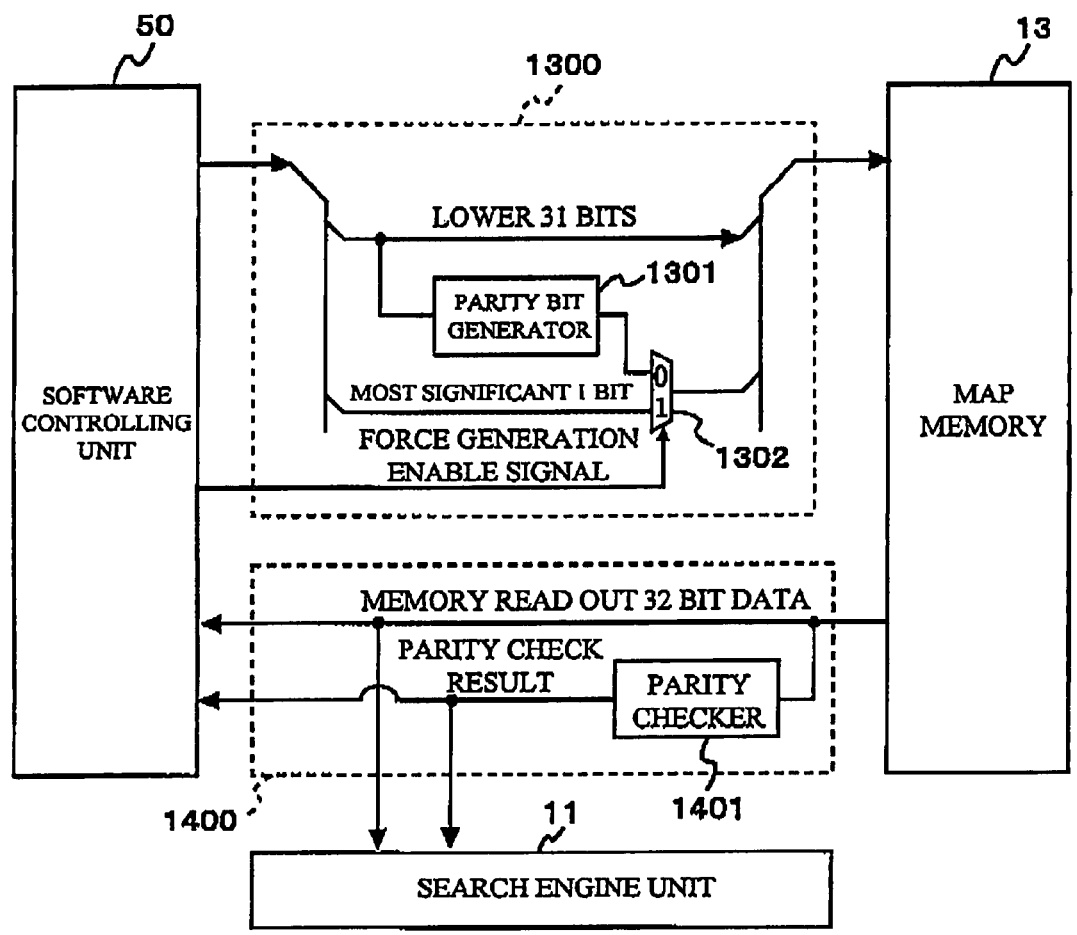
FIG. 22 is an illustration showing a configuration of an error detector of an in-vehicle gateway apparatus.

In the second embodiment of the present invention, as shown in FIG. 22, a parity bit summing unit 1300 and a checker 1400 in the aforementioned first embodiment are provided between the software controlling unit 50 and the map memory 13. By providing these parity bit summing unit 1300 and checker 1400, appending parity bit to the data written to the map memory 13 from the software controlling unit 50, for example, data for a routing map, is performed by the parity bit summing unit 1300 and the parity check of the data which the software controlling unit 50 read out from the map memory 13 is performed by a parity checker 1401. The error judgment of a selector circuit 1302 and the parity checker 1401 is performed in the same procedure as described in the first embodiment mentioned above. The frame data read out from the map memory 13 and the check result of the parity checker 1401 are output to the search engine unit 11 as well.

Figure 23:
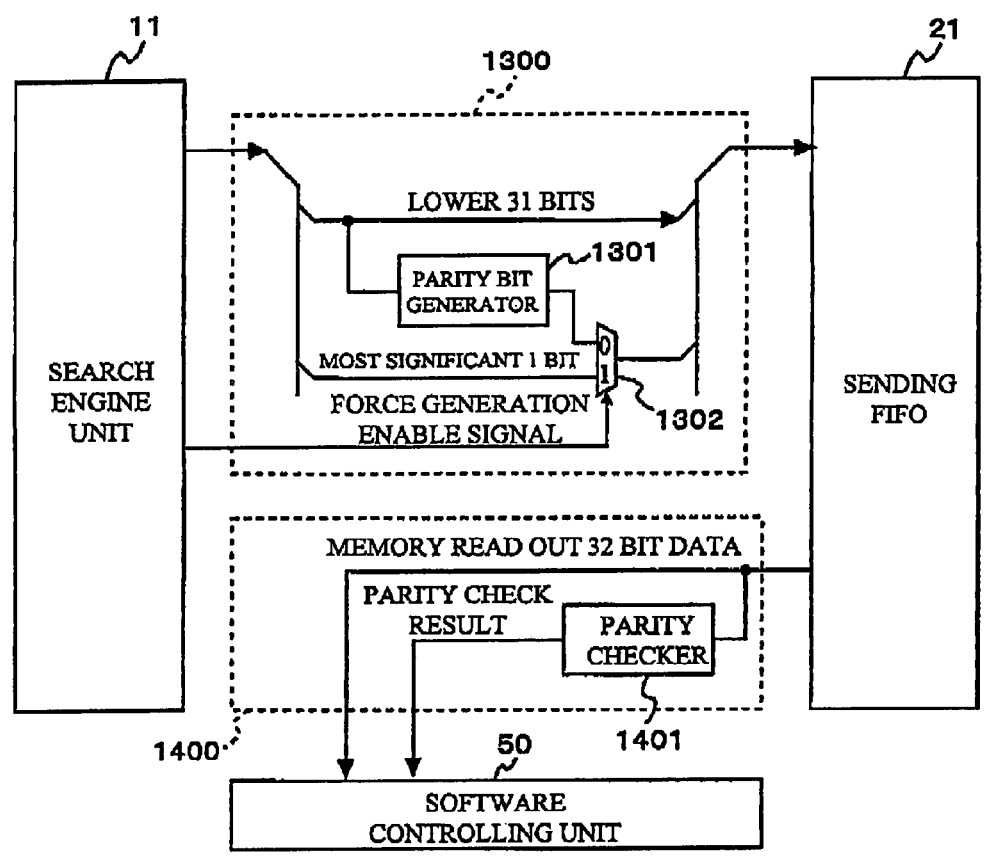
FIG. 23 is an illustration showing another configuration of an error detector of the in-vehicle gateway apparatus.
Figure 24:
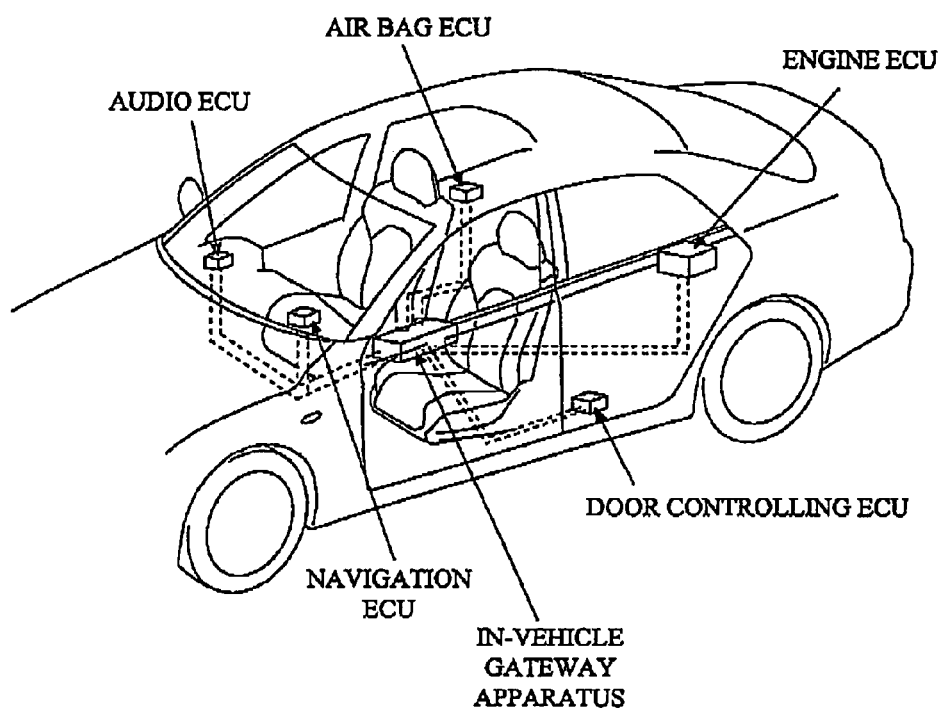
FIG. 24 is an illustration showing connections of a plurality of ECUs and the in-vehicle gateway apparatus.

As shown in FIG. 23, the parity bit summing unit 1300 and the checker 1400 may be provided between the search engine unit 11 and the sending FIFO 21. By providing these parity bit summing unit 1300 and checker 1400, the parity check of the frame data written to the sending FIFO 21 from the search engine unit 11 is performed by the parity checker 1401. The frame data read out from the parity checker 1401 and from the sending FIFO 21 are output to the software controlling unit 50.

In FIG. 23, while the parity check is performed by the software controlling unit 50, the search engine unit 11 may be configured to check the parity.

The abovementioned embodiments are suitable examples of preferred embodiments of the present invention. However, the present invention is not limited to those and various modifications may be made within the spirit and scope of the present invention.

What is claimed is:

1. An error detecting system comprising:
a central processing unit;
a storing apparatus; and
an error detecting apparatus detecting an error of data string which transmitted from the central processing unit to the storing apparatus and is stored in the storing apparatus,
wherein the error detecting apparatus comprises;
a diagnosis data generating part adding diagnosis data to the data string before stored in the data storing apparatus in order to detect an error of the data string,
an error detecting part determining an error of the data string read out from the storing apparatus with reference to the diagnosis data added to the data string; and
a data switching unit selecting first diagnosis data generated by the diagnosis data generating part or second diagnosis data transmitted from the central processing unit, adding selected diagnosis data to the data string transmitted from the central processing unit to the storing apparatus,
wherein the first diagnosis data includes generated first diagnosis data which is generated by the diagnosis data generating part and read out first diagnosis data which added to the data string by the data switching unit, is stored in the data storing apparatus, and then read out from the data storing apparatus by the central processing unit,
wherein the second diagnosis data includes transmitted second diagnosis data which is transmitted from the central processing unit to the data switching unit and read out second diagnosis data which added to the data string by the data switching unit, is stored in the data storing apparatus, and then read out from the data storing apparatus by the central processing unit,
wherein the central processing unit determines an abnormal fixation of the data switching unit based on results of a first determination and a second determination,
wherein the first determination is executed to determine whether or not the transmitted second diagnosis data which is stored in the central processing unit and the read out second diagnosis data are matched each other when the central processing unit transmits to the data switching unit a signal which instruct the data switching unit to select the second diagnosis data,
wherein the second determination is executed to determine whether or not the transmitted second diagnosis data which the central processing unit transmits to the data switching unit and being stored in the central processing unit and the read out first diagnosis data are matched each other when the central processing unit transmits to the data switching unit a signal which instruct the data switching unit to select the first diagnosis data.

2. The error detecting system according to claim 1, wherein the central processing unit executes third determination which determines an abnormality of the error detecting part,
the third determination includes a first process and a second process,
the first process includes transmitting the transmitted second diagnosis data from the central processing unit to the data switching unit, the transmitted second diagnosis data making results of error detection detected by the error detecting apparatus normal or abnormal, adding the transmitted second diagnosis data to the data string, and storing the data string to which the transmitted second diagnosis data is added to the storing apparatus when the central processing unit transmits to the data switching unit a signal which instructs the data switching unit to select the second diagnosis data,
the second process includes determining the abnormality of the error detecting apparatus, which is executed by the central processing unit, based on results of the error detection detected by the error detecting apparatus, the error detecting apparatus executing the error detection with reference to the read out second diagnosis data which added to the data string read out from the storing apparatus, and values of the transmitted second diagnosis data which is transmitted from the central processing unit to the data switching unit.

3. An error detection method for an error detecting system, the error detecting system comprising;
a central processing unit;
a storing apparatus; and
an error detecting apparatus detecting an error of data string which transmitted from the central processing unit to the storing apparatus and is stored in the storing apparatus,
the error detecting apparatus comprising;
a diagnosis data generating part adding diagnosis data to the data string before stored in the data storing apparatus in order to detect an error of the data string,
an error detecting part determining an error of the data string read out from the storing apparatus with reference to the diagnosis data added to the data string; and
a data switching unit selecting first diagnosis data generated by the diagnosis data generating part or second diagnosis data transmitted from the central processing unit, adding selected diagnosis data to the data string transmitted from the central processing unit to the storing apparatus, the first diagnosis data including generated first diagnosis data which is generated by the diagnosis data generating part and read out first diagnosis data which added to the data string by the data switching unit, is stored in the data storing apparatus, and then read out from the data storing apparatus by the central processing unit, the second diagnosis data including transmitted second diagnosis data which is transmitted from the central processing unit to the data switching unit and read out second diagnosis data which added to the data string by the data switching unit, is stored in the data storing apparatus, and then read out from the data storing apparatus by the central processing unit, the method comprising;

performing a first determination step that determines whether or not the transmitted second diagnosis data which is stored in the central processing unit and the read out second diagnosis data are matched each other when the central processing unit transmits to the data switching unit a signal which instruct the data switching unit to select the second diagnosis data;

performing a second determination step that determines whether or not the transmitted second diagnosis data which the central processing unit transmits to the data switching unit and being stored in the central processing unit and the read out first diagnosis data are matched each other when the central processing unit transmits to the data switching unit a signal which instruct the data switching unit to select the first diagnosis data, and performing a third determining step that determines an abnormal fixation of the data switching unit based on results of the first determination step and the second determination step.

* * * * *